(12) United States Patent
Jeon et al.

(10) Patent No.: US 12,382,093 B2
(45) Date of Patent: *Aug. 5, 2025

(54) METHOD AND DEVICE FOR TRANSMITTING IMAGE INFORMATION, AND DECODING METHOD AND DEVICE USING SAME

(71) Applicant: LG Electronics Inc., Seoul (KR)

(72) Inventors: Byeongmoon Jeon, Seoul (KR); Hendry Hendry, Seoul (KR); Jaehyun Lim, Seoul (KR); Yongjoon Jeon, Seoul (KR); Chulkeun Kim, Seoul (KR); Jungsun Kim, Seoul (KR); Seungwook Park, Seoul (KR); Joonyoung Park, Seoul (KR); Sangoh Jeong, Seoul (KR); Naeri Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,866

(22) Filed: Oct. 2, 2023

(65) Prior Publication Data

US 2024/0031601 A1 Jan. 25, 2024

Related U.S. Application Data

(63) Continuation of application No. 17/240,678, filed on Apr. 26, 2021, now Pat. No. 11,812,056, which is a continuation of application No. 16/594,660, filed on Oct. 7, 2019, now Pat. No. 11,025,954, which is a continuation of application No. 14/351,620, filed as (Continued)

(51) Int. Cl.
*H04N 19/593* (2014.01)

(52) U.S. Cl.
CPC .................... *H04N 19/593* (2014.11)

(58) Field of Classification Search
CPC .... H04N 19/593; H04N 19/58; H04N 19/105; H04N 19/132; H04N 19/176; H04N 19/70
See application file for complete search history.

(56) References Cited

U.S. PATENT DOCUMENTS

| 7,403,660 B2 * | 7/2008 | Hannuksela | ......... H04N 19/172 |
| | | | 375/240 |
| 2009/0238269 A1 * | 9/2009 | Pandit | .................. H04N 19/176 |
| | | | 375/E7.243 |

(Continued)

OTHER PUBLICATIONS

Wahadaniah V. and C. Lim "AHG21: Flexible Signalling of long term reference pictures" Joint Collaborative Team on Video Coding (JCT-VC) of ITU-T SG16 WP3 and ISO/IEC JTC1/SC29/WG11 8th Meeting: San Jose, CA, USA, Feb. 1-10, 2012 (Year: 2012).*

(Continued)

*Primary Examiner* — Richard A Hansell, Jr.
(74) *Attorney, Agent, or Firm* — Fish & Richardson P.C.

(57) ABSTRACT

An image decoding method according to the present invention comprises the steps of: acquiring information to form a reference picture set of a current picture by entropy decoding the received bitstream information; and performing prediction on a prediction block inside the current picture by using a reference picture list which is formed based on the reference picture set.

3 Claims, 7 Drawing Sheets

Related U.S. Application Data application No. PCT/KR2012/009475 on Nov. 9, 2012, now Pat. No. 10,440,389.

(60) Provisional application No. 61/558,435, filed on Nov. 11, 2011, provisional application No. 61/563,816, filed on Nov. 27, 2011, provisional application No. 61/667,405, filed on Jul. 2, 2012, provisional application No. 61/609,364, filed on Mar. 11, 2012, provisional application No. 61/612,404, filed on Mar. 19, 2012.

(56) References Cited

U.S. PATENT DOCUMENTS

| | | | | |
|---|---|---|---|---|
| 2009/0262804 | A1* | 10/2009 | Pandit | H04N 19/51 |
| | | | | 375/E7.243 |
| 2013/0058408 | A1* | 3/2013 | Wahadaniah | H04N 19/30 |
| | | | | 375/E7.243 |
| 2013/0077681 | A1* | 3/2013 | Chen | H04N 19/176 |
| | | | | 375/240.12 |
| 2013/0077687 | A1* | 3/2013 | Wang | H04N 19/70 |
| | | | | 375/E7.243 |
| 2013/0114741 | A1* | 5/2013 | Sullivan | H04N 19/573 |
| | | | | 375/E7.026 |
| 2013/0188709 | A1* | 7/2013 | Deshpande | H04N 19/70 |
| | | | | 375/E7.02 |
| 2013/0208792 | A1* | 8/2013 | He | H04N 19/105 |
| | | | | 375/240.12 |
| 2014/0092997 | A1* | 4/2014 | Zhou | H04N 19/65 |
| | | | | 375/E7.189 |
| 2015/0304671 | A1* | 10/2015 | Deshpande | H04N 19/44 |
| | | | | 375/240.12 |

OTHER PUBLICATIONS

Ramasubramonium A. K. et al. "Signalling of long-term reference pictures in the SPS" Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012 (Year: 2012).*

Sjoberg et al. "Overview of HEVC High-Level Syntax and Reference Picture Management", IEEE Transactions on Circuits and systems for Video Technology, vol. 22, No. 12, Dec. 2012 (Year: 2012).*

Mesander B., "The h.264 Sequence Parameter Set", Apr. 20, 2011 (Year: 2011).*

* cited by examiner

METHOD AND DEVICE FOR TRANSMITTING IMAGE INFORMATION, AND DECODING METHOD AND DEVICE USING SAME

CROSS REFERENCE TO RELATED APPLICATIONS

This application is a continuation of U.S. application Ser. No. 17/240,678, filed on Apr. 26, 2021, which is a continuation of U.S. application Ser. No. 16/594,660, filed on Oct. 7, 2019, now U.S. Pat. No. 11,025,954, which is a continuation of U.S. application Ser. No. 14/351,620, filed on Apr. 14, 2014, now U.S. Pat. No. 10,440,389, which claims benefit of International Application PCT/KR2012/009475, filed on Nov. 9, 2012, which claims the benefit of U.S. Provisional Application No. 61/558,435, filed on Nov. 11, 2011, U.S. Provisional Application No. 61/563,816, filed on Nov. 27, 2011, U.S. Provisional Application No. 61/667,405, filed on Jul. 2, 2012, U.S. Provisional Application No. 61/609,364, filed on Mar. 11, 2012, and U.S. Provisional Application No. 61/612,404, filed on Mar. 19, 2012. The disclosures of the prior applications are incorporated by reference in their entirety.

TECHNICAL FIELD

The present invention relates to video processing, and more particularly, to method and device for efficiently transmitting video information and decoding method and device using the same.

BACKGROUND ART

Recently, demands for a high-resolution and high-quality video have increased in various fields of applications. As a video has higher resolution and higher quality, an amount of information on the video increases more.

Accordingly, when video information is transferred using media such as existing wired or wireless broadband lines or video information is stored in existing storage media, the information transfer cost and the information storage cost increase.

High-efficiency video compressing techniques can be used to effectively transfer, store, and reproduce information on high-resolution and high-quality videos.

Inter prediction and intra prediction can be used to enhance video compression efficiency. In the inter prediction, pixel values of a current picture are predicted with reference to information of other pictures. In the intra prediction, pixel values of a current picture are predicted using inter-pixel relationships in the same picture.

When the inter prediction is carried out, a video encoder and a video decoder can perform a prediction process on the basis of a reference picture list specifying reference pictures which can be used for a current block (current picture).

Information for constructing a reference picture list can be transmitted from the video encoder to the video decoder. The video decoder can construct a reference picture list on the basis of the information received from the video encoder and can effectively perform the inter prediction.

SUMMARY OF THE INVENTION

Technical Problem

An object of the present invention is to provide video encoding method and device which can improve video encoding/decoding efficiency.

Another object of the present invention is to provide video decoding method and device which can improve video encoding/decoding efficiency.

Still another object of the present invention is to provide video information transmitting method and device which can improve video encoding/decoding efficiency.

Still another object of the present invention is to provide prediction method and device which can improve video encoding/decoding efficiency.

Still another object of the present invention is to provide reference picture list constructing method and device which can improve video encoding/decoding efficiency.

Solution to Problem

According to an aspect of the present invention, there is provided a video decoding method. The video decoding method may include the steps of: acquiring information for constructing a reference picture set of a current picture by entropy-decoding received bitstream information; and performing a prediction operation on a prediction target block in the current picture using a reference picture list constructed on the basis of the reference picture set. Here, the information for constructing the reference picture set may include first flag information specifying a long-term reference picture (LTRP) is used to perform an inter prediction operation on at least one picture belonging to a current sequence, and the first flag information may be transmitted through a sequence parameter set (SPS) sequence by sequence.

When the first flag information specifies that a long-term reference picture (LTRP) is used to perform an inter prediction operation on at least one picture belonging to the current sequence, the reference picture set may include a long-term reference picture (LTRP) set, and the information for constructing the reference picture set may further include information for deriving a picture order count (POC) of an LTRP to be included in the LTRP set.

The information for deriving the POC may include a sequence parameter set (SPS) LTRP index information specifying an LTRP to be included in the LTRP set out of one or more SPS candidate LTRPs to be transmitted through an SPS, the POC of the LTRP to be included in the LTRP set may be derived on the basis of a least significant bit (LSB) of the POC of the LTRP specified by the SPS LTRP index information, and the SPS LTRP index information may be transmitted through a slice header corresponding to the current picture.

The information for constructing the reference picture set may include second flag information specifying whether the LTRP specified by the SPS LTRP index information is used as a reference picture of a picture belonging to the current sequence, the LTRP set may not include the LTRP specified by the SPS LTRP index information when the second flag information specifies that the LTRP specified by the SPS LTRP index information is not used as a reference picture of the picture belonging to the current sequence, and the second flag information may be transmitted through a SPS sequence by sequence.

The SPS LTRP index information may be encoded and transmitted on the basis of a fixed number of bits.

The information for deriving the POC may include POC LSB information specifying the LSB of the POC of the LTRP to be included in the LTRP set, the POC of the LTRP to be included in the LTRP set may be derived on the basis of the POC LSB information, and the POC LSB information may be transmitted through a slice header corresponding to the current picture.

The information for constructing the reference picture set may include third flag information specifying whether the LTRP having the POC derived on the basis of the POC LSB information is used as a reference picture of the current picture, the LTRP set may not include the LTRP having the POC derived on the basis of the POC LSB information when the third flag information specifies that the LTRP having the POC derived on the basis of the POC LSB information is not used as a reference picture of the current picture, and the third flag information may be transmitted through a slice header corresponding to the current picture.

According to another aspect of the present invention, there is provided a video decoder. The video decoder may include: an entropy decoding module that acquires information for constructing a reference picture set of a current picture by entropy-decoding received bitstream information; a prediction module that constructing a predicted block corresponding to a prediction target block in the current picture by performing a prediction operation on the prediction target block using a reference picture list constructed on the basis of the reference picture set; and a reconstructed block constructing unit that constructs a reconstructed block on the basis of the predicted block. Here, the information for constructing the reference picture set may include first flag information specifying whether a long-term reference picture (LTRP) is used to perform an inter prediction operation on at least one picture belonging to a current sequence, and the first flag information may be transmitted through a sequence parameter set (SPS) sequence by sequence.

According to still another aspect of the present invention, there is provided a video information transmitting method. The video information transmitting method may include the steps of: performing an inter prediction operation on a current picture using a reference picture list; and entropy-encoding and transmitting information for constructing a reference picture set used to construct the reference picture list. Here, the information for constructing the reference picture set may include first flag information specifying whether a long-term reference picture (LTRP) is used to perform an inter prediction operation on at least one picture belonging to a current sequence, and the step of entropy-encoding and transmitting the information may include transmitting the first flag information through a sequence parameter set (SPS) sequence by sequence.

When the first flag information specifies that a long-term reference picture (LTRP) is used to perform an inter prediction operation on at least one picture belonging to the current sequence, the reference picture set may include a long-term reference picture (LTRP) set, and the information for constructing the reference picture set may further include information for deriving a picture order count (POC) of an LTRP to be included in the LTRP set.

The information for deriving the POC may include a sequence parameter set (SPS) LTRP index information specifying an LTRP to be included in the LTRP set out of one or more SPS candidate LTRPs to be transmitted through an SPS, and the step of entropy-encoding and transmitting the information may include transmitting SPS POC least significant bit (LSB) information specifying an LSB of the POC of each of the one or more SPS candidate LTRPs through the SPS sequence by sequence and transmitting the SPS LTRP index information through a slice header corresponding to the current picture.

The information for constructing the reference picture set may include second flag information specifying whether the LTRP specified by the SPS LTRP index information is used as a reference picture of a picture belonging to the current sequence, the LTRP set may not include the LTRP specified by the SPS LTRP index information when the second flag information specifies that the LTRP specified by the SPS LTRP index information is not used as a reference picture of the picture belonging to the current sequence, and the step of entropy-encoding and transmitting the information may include transmitting the second flag information through a SPS sequence by sequence.

The step of entropy-encoding and transmitting the information may include entropy-encoding the SPS LTRP index information on the basis of a fixed number of bits.

The information for deriving the POC may include POC LSB information specifying the LSB of the POC of the LTRP to be included in the LTRP set, and the step of entropy-encoding and transmitting the information may include transmitting the POC LSB information through a slice header corresponding to the current picture.

The information for constructing the reference picture set may include third flag information specifying whether the LTRP having the POC corresponding to the POC LSB information is used as a reference picture of the current picture, the LTRP set may not include the LTRP having the POC derived on the basis of the POC LSB information when the third flag information specifies that the LTRP having the POC corresponding to the POC LSB information is not used as a reference picture of the current picture, and the step of entropy-encoding and transmitting the information may include transmitting the third flag information through a slice header corresponding to the current picture.

According to still another aspect of the present invention, there is provided a video information transmitting device. The video information transmitting device may include: a prediction module that performs an inter prediction operation on a current picture using a reference picture list; and an entropy encoding module that entropy-encodes and transmits information for constructing a reference picture set used to construct the reference picture list. Here, the information for constructing the reference picture set may include first flag information specifying whether a long-term reference picture (LTRP) is used to perform an inter prediction operation on at least one picture belonging to a current sequence, and the entropy encoding module may transmit the first flag information through a sequence parameter set (SPS) sequence by sequence.

Advantageous Effects

By employing the video encoding method according to the present invention, it is possible to improve the video encoding/decoding efficiency.

By employing the video decoding method according to the present invention, it is possible to improve the video encoding/decoding efficiency.

By employing the video information transmitting method according to the present invention, it is possible to improve the video encoding/decoding efficiency.

By employing the prediction method according to the present invention, it is possible to improve the video encoding/decoding efficiency.

By employing the reference picture list constructing method according to the present invention, it is possible to improve the video encoding/decoding efficiency.

DESCRIPTION OF EXEMPLARY EMBODIMENTS

Figure 1:
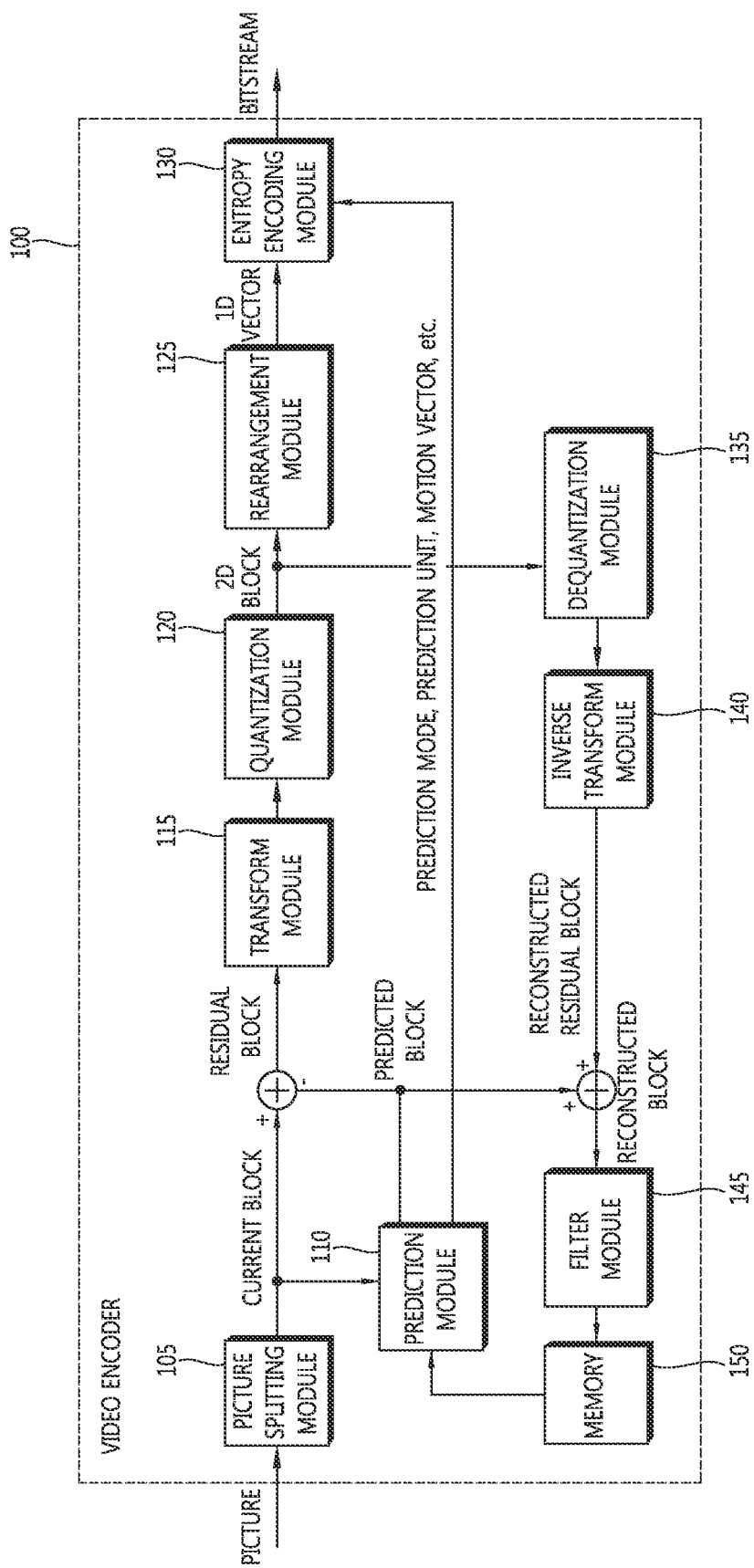
FIG. 1 is a block diagram schematically illustrating a video encoder according to an embodiment of the present invention.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for specifying that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the present invention. Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 may split an input picture into at least one process unit. Here, the process unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction operation and an intra prediction module that performs an intra prediction operation. The prediction module 110 may perform a prediction operation on the process unit of the picture split by the picture splitting module 105 to construct a predicted block. The process unit of a picture in the prediction module 110 may be a CU, a TU, or a PU. It may be determined whether the prediction operation performed on the corresponding process unit is an inter prediction operation or an intra prediction operation, and specific details (for example, a prediction mode) of the prediction methods may be determined. The process unit subjected to the prediction operation may be different from the process unit of which the prediction method and the specific details are determined. For example, the prediction method and the prediction mode may be determined in the units of PU and the prediction operation may be performed in the units of TU.

In the inter prediction, a prediction operation may be performed on the basis of information on at least one of a previous picture and/or a subsequent picture of a current picture to construct a predicted block. In the intra prediction, a prediction operation may be performed on the basis of pixel information of a current picture to construct a predicted block.

A skip mode, a merge mode, a motion vector prediction (MVP), or the like may be used as the intra prediction method. In the inter prediction, a reference picture may be selected for a PU, and a reference block having the same size as the PU may be selected. The reference block may be selected in the unit of integer pixels. A predicted block may be constructed so that a residual signal from a current PU is minimized and the magnitude of a motion vector is minimized.

The predicted block may be constructed in the unit of integer pixel samples or in the unit of pixel samples less than an integer pixel, such as ½ pixel samples and ¼ pixel samples. Here, a motion vector may also be expressed in the unit of pixel samples less than an integer pixel. For example, luma pixels may be expressed in the unit of ¼ pixels and chroma pixels may be expressed in the unit of ⅛ pixels.

Information such as an index of a reference picture selected through the inter prediction, a motion vector (for example, a motion vector predictor), and a residual signal may be entropy-encoded and transmitted to a video decoder. When the skip mode is used, the predicted block may be used as a reconstructed block and thus the residual signal may not be created, converted, quantized, and transmitted.

When the intra prediction is performed, a prediction mode may be determined in the unit of PUs and the prediction operation may be performed in the unit of PUs. Alternatively, a prediction mode may be determined in the unit of PUs and the intra prediction may be performed in the unit of TUs.

The prediction modes in the intra prediction may include 33 directional prediction modes and at least two non-directional modes. The non-directional modes may include a DC prediction mode and a planar mode.

In the intra prediction, a predicted block may be constructed after a filter is applied to reference samples. At this time, it may be determined whether a filter should be applied to reference samples, depending on the intra prediction mode of a current block and/or the size of the current block.

A PU may be a block having various sizes/shapes. For example, in case of the inter prediction, a PU may be a 2N×2N block, a 2N×N block, a N×2N block, or a N×N block (where N is an integer). In case of the intra prediction, a PU may be a 2N×2N block or a N×N block (where N is an integer). The PU having a block size of N×N may be set to be used in only a specific case. For example, the PU having a block size of N×N may be set to be used for only a CU having the smallest size or may be set to be used for only the intra prediction. In addition to the above-mentioned sizes, PUs such as a N×mN block, a mN×N block, a 2N×mN block, and a mN×2N block (where m<1) may be additionally defined and used.

Residual values (a residual block or a residual signal) between the constructed predicted block and the original block may be input to the transform module 115. The prediction mode information, the motion vector information, and the like used for the prediction may be encoded along with the residual values by the entropy encoding module 130 and may be transmitted to the video decoder.

The transform module 115 may perform a transform operation on the residual block by transform units and created transform coefficients. The transform unit in the transform module 115 may be a TU and may have a quad tree structure. The size of the transform unit may be determined within a predetermined range of largest and smallest sizes. The transform module 115 may transform the residual block using a discrete cosine transform (DCT) and/or a discrete sine transform (DST).

The quantization module 120 may quantize the residual values transformed by the transform module 115 and may create quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through a coefficient scanning method. The rearrangement module 125 may enhance the entropy encoding efficiency in the entropy encoding module 130 by changing the coefficient scanning order on the basis of stochastic statistics of the coefficients transmitted from the quantization module.

The entropy encoding module 130 may perform an entropy encoding operation on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, split unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The dequantization module 135 dequantizes the values quantized by the quantization module 120. The inverse transform module 140 inversely transforms the values dequantized by the dequantization module 135. The residual values created by the dequantization module 135 and the inverse transform module 140 may be merged with the predicted block predicted by the prediction module 110 to construct a reconstructed block.

FIG. 1 illustrates that the residual block and the predicted block are added by an adder to construct a reconstructed block. Here, the adder may be considered as a particular module (reconstructed block constructing module) that constructs a reconstructed block.

The filter module 145 may apply a deblocking filter, a sample adaptive offset (SAO), and/or an adaptive loop filter (ALF) to the reconstructed picture.

The deblocking filter may remove a block distortion generated at the boundary between blocks in the reconstructed picture. The SAO may reconstruct an offset difference of the residual block, which has been subjected to the deblocking filter, from the original video in the unit of pixels and may be applied in the form of a band offset and an edge offset. The ALF may perform a filtering operation on the basis of the resultant values of comparison of the original picture with the reconstructed picture of which the blocks have been filtered by the deblocking filter and/or the SAO. The ALF may be applied only when high efficiency is necessary.

On the other hand, the filter module 145 may not perform a filtering operation on the reconstructed block used in the inter prediction.

The memory 150 may store the reconstructed block or picture calculated by the filter module 145. The reconstructed block or picture stored in the memory 150 may be supplied to the prediction module 110 that performs the inter prediction.

Figure 2:
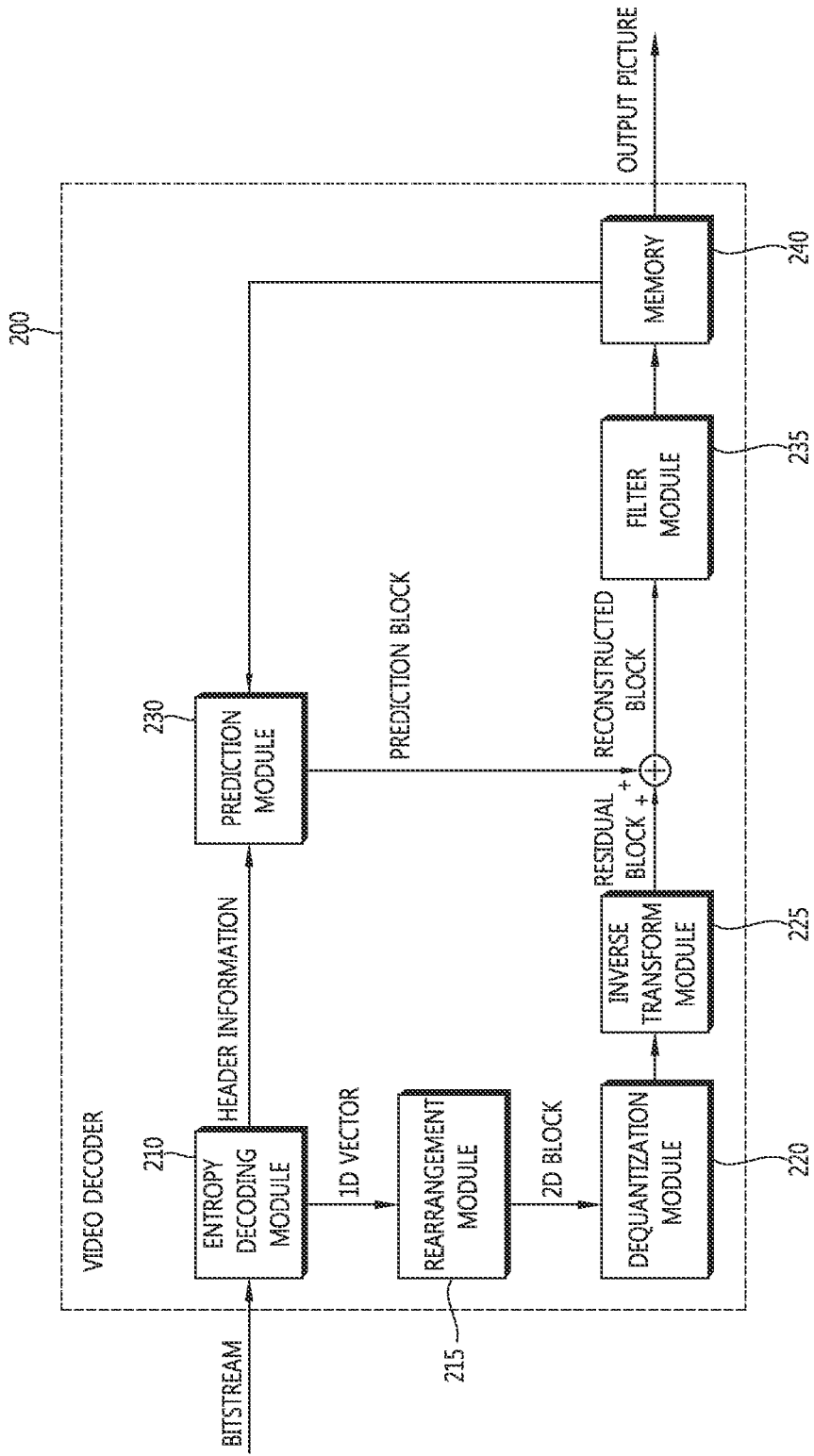
FIG. 2 is a block diagram schematically illustrating a video decoder according to an embodiment of the present invention.

FIG. 2 is a block diagram schematically illustrating a video decoder according to an embodiment of the present invention. Referring to FIG. 2, a video decoder 200 may include an entropy decoding module 210, a rearrangement module 215, a dequantization module 220, an inverse transform module 225, a prediction module 230, a filter module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values entropy-decoded by the entropy decoding module 210 may be input to the rearrangement module 215.

The rearrangement module 215 may rearrange the bitstream entropy-decoded by the entropy decoding module 210 on the basis of the rearrangement method in the video encoder. The rearrangement module 215 may reconstruct and rearrange coefficients expressed in the form of a one-dimensional vector into coefficients in the form of a two-dimensional block. The rearrangement module 215 may be supplied with information associated with the coefficient scanning performed by the video encoder and may perform the rearrangement using a method of inversely scanning the coefficients on the basis of the scanning order in which the scanning is performed by the video encoder.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a split unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240.

When the prediction mode of a current PU is an intra prediction mode, the prediction module 230 may perform an intra prediction operation of constructing a predicted block on the basis of pixel information of a current picture.

When the prediction mode for a current PU is the inter prediction mode, the prediction module 230 may perform the inter prediction operation on the current PU on the basis of information included in at least one of a previous picture and a subsequent picture of the current picture. At this time, motion information for the inter prediction of the current PU, for example, information on motion vectors and reference picture indices, supplied from the video encoder may be derived from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filter module 235. The filter module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

Encoded or decoded pictures may be stored in a memory such as a decoded picture buffer (DPB). When a current picture is encoded or decoded, the previous pictures stored in the DPB may be referred to for performing a prediction operation on the current picture.

Specifically, the video encoder and the video decoder may stored the previously-encoded/decoded pictures in a reference picture list for use in the inter prediction.

When the inter prediction is performed, the video encoder and the video decoder may perform a prediction operation on a target block (current block) of a current picture with reference to another picture. The inter prediction may be performed by the prediction modes of the video encoder and the video decoder as illustrated in FIGS. 1 and 2.

When the inter prediction is performed, as described above, the prediction operation may be performed on the current block using information of available neighboring blocks adjacent to the current block. Here, the neighboring blocks may include a "Col block" belonging to reference pictures which the current block can refer to. Here, the Col block may be determined on the basis of the relative position to the "co-located block" spatially located at the same position as the current block in a reference picture which the current block can refer to. For example, a storage unit covering pixels at predetermined relative positions corresponding to the co-located block may be specified and the Col block may be a block covering the leftmost-top pixel in the storage unit.

In the below description, for the purpose of convenience of explanation, a neighboring block used to perform a prediction operation on a current block in the inter prediction is referred to as a "candidate block".

In the inter prediction, the prediction operation may be performed on the current block on the basis of information of candidates blocks. In case of the skip mode or the merge mode, motion information (for example, motion vector) and/or a reference picture for a candidate block selected from the candidate blocks may be used as the motion information and/or the reference picture for the current block.

When the MVP is performed, the motion information (for example, motion vector) for a selected candidate block may be used as a predicted value of a motion vector for the current block, and the reference picture information for the current block may be transmitted from the video encoder to the video decoder. A motion vector difference (MVD) between the MVP derived from the candidate block and the motion vector for the current block may be transmitted from the video encoder to the video decoder, and the prediction module of the video decoder may indue the motion information for the current block on the basis of the MVP and the MVD.

Figure 3:
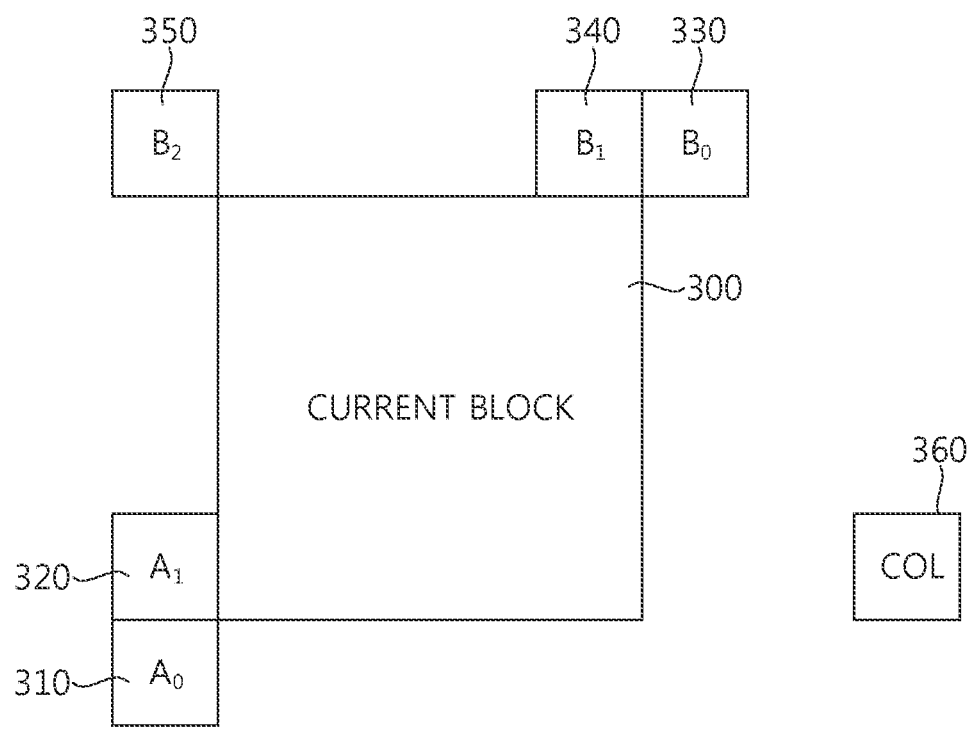
FIG. 3 is a diagram schematically illustrating examples of a candidate block which can be used to perform an inter prediction process on a current block.

FIG. 3 is a diagram schematically illustrating an example of candidate blocks which can be used when the inter prediction is performed on a current block.

The prediction modules of the video encoder and the video decoder may use a neighboring block located at a predetermined position around a current block 400 as a candidate block. For example, in the example of FIG. 3, two blocks $A_0$ 410 and $A_1$ 420 located on the left-bottom of the current block and three blocks $B_0$ 430, $B_1$ 440, and $B_2$ 450 located on the right-top and the left-top of the current block may be selected as spatial candidate blocks. In addition to the blocks spatially adjacent, the Col block 460 may be used as a temporal candidate block.

On the other hand, regarding reference pictures used for the inter prediction, reference pictures for the current blocks may be derived from reference pictures of neighboring blocks or may be specified by information received from the video encoder. In case of the skip mode or the merge mode, the prediction module of the video decoder may use the reference pictures of the neighboring blocks as the reference pictures for the current block. When the MVP is applied, the prediction module of the video decoder may receive the information specifying the reference pictures for the current block from the video encoder.

Pictures encoded/decoded previously to the current picture may be stored in a memory (for example, a decoded picture buffer (DPB) and may be used for prediction of the current block (current picture). Pictures which are available for the inter prediction of the current block may be stored in a reference picture list. Here, a reference picture to be used for the inter prediction of the current block among the reference pictures included in the reference picture list may be specified by a reference picture index. That is, a reference picture index may mean an index specifying a reference picture to be used for the inter prediction of the current block out of the reference pictures of the reference picture list.

An I slice is a slice which is decoded through the intra prediction. A P slice is a slice which is decoded through the intra prediction or the inter prediction using at most one motion vector and one reference picture. A B slice is a slice which is decoded through the intra prediction or the inter prediction using at most two motion vectors and two reference pictures. Here, reference pictures may include a short-term reference picture (hereinafter, referred to as STRP) and a long-term reference picture (hereinafter, referred to as LTRP).

A short-term reference picture and a long-term reference picture may be reconstructed pictures stored in the DPB. A short-term reference picture may be marked as "used for short-term reference" or "used for reference". A long-term reference picture may be marked as "used for long-term reference" or "used for reference". For example, a picture order count difference between a picture to be decoded and along-term reference picture may have a value in a range of "1" to "$2^{24}-1$". Here, the picture order count (POC) may specify a picture display order.

Reference picture list 0 (hereinafter, referred to as "L0" for the purpose of convenience of explanation) is a reference picture list used for the inter prediction of a P slice or a B slice. Reference picture list 1 (hereinafter, referred to as "L1" for the purpose of convenience of explanation) may be used for the inter prediction of a B slice. Therefore, uni-directional prediction based on L0 may be performed at the time of inter prediction of a block of a P slice, and bi-directional prediction (bi-prediction) based on L0 and L1 may be performed at the time of inter prediction of a block of a B slice.

The video encoder and/or the video decoder may construct a reference picture list when an encoding/decoding operation is performed on a P slice and a B slice through the use of inter prediction. At this time, a reference picture to be used for the inter prediction may be specified by a reference picture index. As described above, a reference picture index may mean an index specifying a reference picture to be used for the inter prediction.

The reference picture list may be constructed on the basis of a reference picture set determined or constructed by the video encoder and the video decoder. The reference pictures constituting the reference picture list may be stored in a memory (for example, DPB). The pictures (pictures encoded/decoded previously to a current picture) stored in the memory may be managed by the video encoder and the video decoder.

When a sliding window method is used as the method of managing the reference pictures, the reference pictures may be managed by a simple method of releasing a reference picture in a predetermined time passes after the reference picture is stored in the memory, but this method has several problems. For example, since there is a reference picture which is not available any more, the reference picture may not be released from the memory and thus efficiency may be lowered. Since a stored reference picture is released from the memory after a predetermined time, it may be difficult to manage LTRPs.

A memory management command operation (MMCO) method of signaling instruction information on management of reference pictures from the video encoder may be used in consideration of the problems of the sliding window method. Particularly, in the MMCO method, a command for allocating a picture to an LTRP, a command for changing the state of an LTRP to an STRP, and a command for marking an LTRP as "unused for reference" may be defined in regard to management of LTRPs.

However, when the MMCO method is used, picture loss may occur in the course of signaling. When a lost picture includes an MMCO command, the lost MMCO information may not be reconstructed and the memory (DPB) may not be maintained in a state where currently-necessary pictures are correctly managed. Therefore, there is a possibility that the inter prediction will be performed incorrectly.

In order to solve the above-mentioned problems, a method of transmitting information associated with a reference picture set necessary at decoding a slice (and/or a picture) through a sequence parameter set (SPS), a picture parameter set (PPS), and/or a slice header may be used. At this time, the reference picture list may be constructed on the basis of the reference picture set.

A reference picture set may include reference pictures to be used for reference of a current picture/slice or a future picture/slice. The reference pictures used at decoding a slice (and/or a picture) may include an STRP and a LTRP. The STRP may include a forward short-term reference picture having a POC smaller than that of the current picture and a backward short-term reference picture having a POC larger than that of the current picture. Here, the reference picture sets may be determined or constructed for each of the forward short-term reference picture, the backward short-term reference picture, and the long-term reference picture.

In this specification, for the purpose of convenience of explanation, a reference picture set for the forward short-term reference picture is referred to as a forward short-term reference picture set, a reference picture set for the backward short-term reference picture is referred to as a backward short-term reference picture set, and a reference picture set for the long-term reference picture is referred to as a long-term reference picture set. For example, the forward short-term reference picture set may be expressed by RefPicSetStCurrBefore, the backward short-term reference picture set may be expressed by RefPicSetStCurrAfter, and the long-term reference picture set may be expressed by RefPicSetLtCurr.

Figure 4:
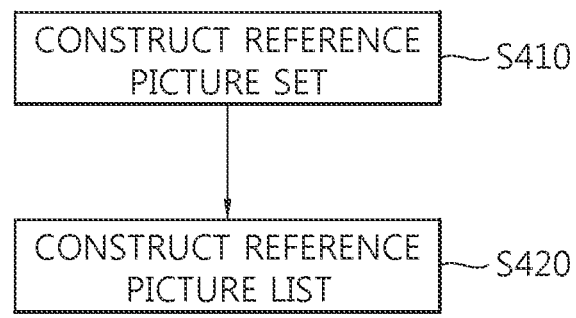
FIG. 4 is a flowchart schematically illustrating an example of a method of constructing a reference picture list on the basis of a reference picture set.

FIG. 4 is a flowchart schematically illustrating an example of a method of constructing a reference picture list on the basis of a reference picture set.

In the example illustrated in FIG. 4, the operation of the video decoder is mainly described for the purpose of convenience of explanation. A reference picture list constructing step to be described later may be considered as a reference picture list initializing step.

Referring to FIG. 4, the video decoder may construct a reference picture set on the basis of reference picture set information transmitted from the video encoder (S410). For example, the reference picture set may be constructed for each picture to be subjected to inter prediction.

Here, the reference picture set may include the forward short-term reference picture set, the backward short-term reference picture set, and the long-term reference picture set. The reference pictures included in each reference picture set may be specified by the POC. The POC indicates a picture display order.

The POCs of the reference pictures included in the forward short-term reference picture set and the backward short-term reference picture set may be determined by relative POCs. Here, information on the relative POC may be transmitted from the video encoder to the video decoder.

The relative POC may represent a POC difference between two pictures in a reference picture set. The relative POCs of the reference pictures (reference pictures having POCs smaller than that of the current picture) previous to the current picture in the POC order may correspond to POC differences from an immediately-previous reference picture in the reference picture set. The relative POCs of the reference pictures (reference pictures having POCs larger than that of the current picture) subsequent to the current picture in the POC order may correspond to POC differences from an immediately-previous reference picture in the reference picture set.

In the forward short-term reference picture set, forward short-term reference pictures having POC values smaller than the POC of the current picture may be located in the descending order of POCs. In other words, the pictures having POC values smaller than the POC of the current picture out of the pictures stored in the DPB may be located in the descending order of POCs from the first position of the forward short-term reference picture set.

In the backward short-term reference picture set, backward short-term reference pictures having POC values larger than the POC of the current picture may be located in the ascending order of POCs. In other words, the pictures having POC values larger than the POC of the current picture out of the pictures stored in the DPB may be located in the ascending order of POCs from the first position of the forward short-term reference picture set.

The reference pictures included in the long-term picture set may be determined on the basis of long-term reference picture set information transmitted from the video encoder. Here, the long-term reference picture set information may include information for determining reference pictures (and/or the POCs of the reference pictures) included in the long-term reference picture set. Examples of the long-term reference picture set information transmitted from the video encoder to the video decoder will be described later.

Referring to FIG. 4 again, the video decoder may construct a reference picture list on the basis of the reference picture set (S420).

When reference picture list L0 is constructed, the video decoder may construct the reference picture list by allocating reference picture indices in the order of forward short-term reference pictures constituting the forward short-term reference picture set, backward short-term reference pictures constituting the backward short-term reference picture set, and long-term reference pictures constituting the long-term reference picture set. That is, forward short-term reference pictures may be allocated to reference picture list L0, then backward short-term reference pictures may be added thereto, and long-term reference pictures may be added thereto finally.

The forward short-term reference pictures constituting the forward short-term reference picture set may be added to reference picture list L0 in the same order as the order in which the forward short-term reference pictures are included in the forward short-term reference picture set. That is, the forward short-term reference pictures may be located in the descending order of POCs in reference picture list L0 and the smaller the POC is, the larger value the reference picture index may have. The backward short-term reference pictures may be added to reference picture list L0 in the same order as the order in which the backward short-term reference pictures are included in the backward short-term reference picture set. That is, the backward short-term reference pictures may be located in the ascending order of POCs in reference picture list L0 and the larger the POC is, the larger value the reference picture index may have. The long-term reference pictures may be added to reference picture list L0 in the same order as the order in which the long-term reference pictures are included in the long-term reference picture set.

In case of the B slice, reference picture list L1 may also be constructed as well as reference picture list L0. When reference picture list L1 is constructed, the video decoder may construct the reference picture list by allocating the reference picture indices in the order of the backward short-term reference pictures constituting the backward short-term reference picture set, the forward short-term reference pictures constituting the forward short-term reference picture set, and the long-term reference pictures constituting the long-term reference picture set. That is, the backward short-term reference pictures may be first allocated to reference picture list L1, then the forward short-term reference pictures may be added thereto, and the long-term reference pictures may finally be added thereto.

The backward short-term reference pictures constituting the backward short-term reference picture set may be added to reference picture list L1 in the same order as the order in which the backward short-term reference pictures are included in the backward short-term reference picture set. That is, the backward short-term reference pictures may be located in the ascending order of POCs in reference picture list L1 and the larger the POC is, the larger value the reference picture index may have. The forward short-term reference pictures may be added to reference picture list L1 in the same order as the order in which the forward short-term reference pictures are included in the forward short-term reference picture set. That is, the forward short-term reference pictures may be located in the descending order of POCs in reference picture list L1 and the smaller the POC is, the larger value the reference picture index may have. The long-term reference pictures may be added to reference picture list L1 in the same order as the order in which the long-term reference pictures are included in the long-term reference picture set.

Reference picture indices may be sequentially allocated to the reference pictures added to reference picture lists L0 and L1.

The video decoder may use N reference pictures (reference pictures having reference picture indices 0 to N−1, where N is a natural number) from the first reference picture in the reference picture list as available reference pictures. Here, information on the number of available reference pictures N may be transmitted from the video encoder.

In the above-mentioned step, the reference picture list may be considered to being implicitly derived. When a reference picture list is implicitly derived, the video encoder and the video decoder may derive the reference picture list to be used for the inter prediction of the current picture on the basis of the POCs of pictures as described above.

On the other hand, the video decoder may modify the implicitly-derived reference picture list on the basis of information explicitly transmitted from the video encoder. At this time, the video encoder may transmit entry information specifying specific entries of the reference picture list along with reference picture list modification information specifying that the implicitly-derived reference picture list is modified. When the reference picture list is finally specified by modifying the reference picture list on the basis of the information explicitly transmitted from the video encoder, it may be considered that the reference picture list is explicitly specified.

The video encoder may transmit entry information of L0 when L0 is specified explicitly. The entry information of L0 may indicate reference pictures corresponding to indices in L0. The video encoder may transmit entry information of L1 when L1 is specified explicitly. The entry information of L1 may indicate reference pictures corresponding to indices in L1.

For example, when a reference picture list is explicitly specified by the entry information, the order (and/or the reference picture indices) of forward short-term reference pictures, backward short-term reference pictures, and long-term reference pictures in the reference picture list may be different from the order (and/or the reference picture indices) in the implicitly-derived reference picture list. When the reference picture list is specified by the entry information, available reference pictures to be used may be different from those in the implicitly-derived reference picture list.

When the reference picture list is explicitly specified, the video decoder may construct the same reference picture list as the reference picture list constructed by the video encoder on the basis of reference picture list correction information and the entry information.

In the above-mentioned method of implicitly deriving a reference picture list, the reference picture set and the reference picture list are described in consideration of only available pictures for the purpose of convenience of explanation, but the video encoder and the video decoder may construct the reference picture set and/or the reference picture list in consideration of availability of reference pictures.

Figure 5:
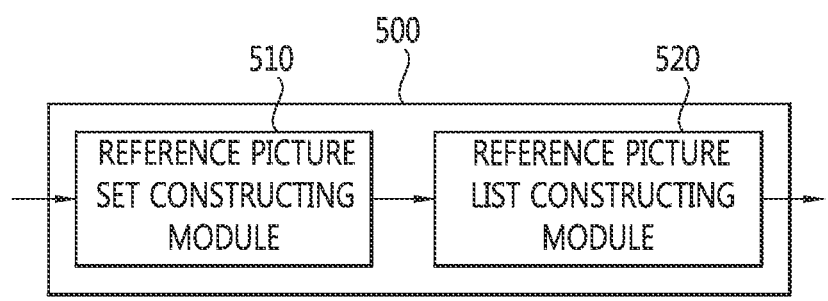
FIG. 5 is a block diagram schematically illustrating an example of a device for initializing a reference picture list.

FIG. 5 is a block diagram schematically illustrating an example of a device for initializing a reference picture list.

In the example illustrated in FIG. 5, a reference picture list initializing device 500 includes a reference picture set constructing unit 510 and a reference picture list constructing unit 520.

Referring to FIG. 5, the reference picture set constructing unit 510 may construct a reference picture set-relevant on the basis of input reference picture set information. For example, a reference picture set may be constructed for every picture subjected to the inter prediction. Examples of the reference picture set-relevant information transmitted from the video encoder to the video decoder will be described later.

Here, the reference picture set may include a forward short-term reference picture set, a backward short-term reference picture set, and long-term reference picture set. The reference pictures included in each reference picture set may be specified by picture order count (POC). The POC indicates a picture display order.

Specific details of the operation which is performed by the reference picture set constructing unit 510 is the same as described in the step (S410) of constructing a reference picture set in FIG. 4 and thus will not be repeatedly described.

Referring to FIG. 5 again, the reference picture list constructing unit 520 may construct a reference picture list on the basis of the reference picture set. The reference picture list constructed by the reference picture list constructing unit 520 may include L0 and L1. Specific details of the operation which is performed by the reference picture list constructing unit 520 is the same as described in the step (S420) of constructing a reference picture list in FIG. 4 and thus will not be repeatedly described.

The reference picture list constructed by the reference picture list constructing unit 520 may be stored in the DPB for prediction or may be transmitted to the prediction module for reference for prediction.

Here, it is described that the initialization of a reference picture list is performed by another element (reference picture list initializing device), but this is for the purpose of convenience of explanation and easy understanding of the present invention and the present invention is not limited to this configuration. For example, the initialization of a reference picture list may be performed by the memories, for example, the DPBs, of the video encoder and the video decoder described with reference to FIGS. 1 and 2. In this case, the reference picture list initializing device may be the DPBs. The initialization of a reference picture list may be performed by the prediction modules of the video encoder and the video decoder described with reference to FIGS. 1 and 2. In this case, the reference picture list initializing device may be the prediction module. In addition, the reference picture list initializing device may be included as a particular module in the video encoder and the video decoder.

In this specification, examples of a method of transmitting or signaling information on a long-term reference picture set of long-term reference pictures and constructing a long-term reference picture set will be described below. A reference picture in the following description may mean a long-term reference picture and a long-term reference picture may be referred to as an LTRP. In this specification, the signaling of information may have a meaning of transmitting other information which can be used to derive the information as well as a meaning of explicitly or directly transmitting information.

In this specification, the long-term reference picture set relevant information transmitted from the video encoder to the video decoder may be described as plural syntax elements. Names of syntax elements and parameters defined in a sequence parameter set (SPS), a picture parameter set (PPS), and/or a slice header are arbitrary and the syntax elements and parameters having the functions identical or similar thereto are included in the scope of the present invention regardless of the names thereof.

For example, the video encoder may transmit LTRP flag information in the unit of sequences specifying whether an LTRP is present in a current bitstream and/or a current sequence to the video decoder. A syntax element specifying the flag information may be defined in an SPS and may be expressed as in Table 1.

TABLE 1

| | Descriptor |
|---|---|
| seq_parameter_set_rbsp( ) { | |
| ... | |
| use_long_term_reference_flag | u(1) |
| ... | |
| } | |

In Table 1, use_long_term_reference_flag may be a flag specifying whether an LTRP is present in a current bit stream and/or a current sequence. Referring to Table 1, use_long_term_reference_flag may be defined as an SPS. For example, when use_long_term_reference_flag equal 0, the flag may specify that an LTRP is not present in the current bit stream and/or the current sequence. When use_long_term_reference_flag equal 1, the flag may specify that an LTRP is present in the current bit stream and/or the current sequence. In this case, the video encoder may transmit LTRP flag information specifying whether an LTRP is present in the current bit stream and/or the current sequence for each sequence.

When use_long_term_reference_flag specifies that an LTRP is not present in the current sequence, the video encoder may not transmit long-term reference picture set-relevant information other than use_long_term_reference_flag for the current sequence to the video decoder. Therefore, the video decoder may not receive or process the long-term reference picture set-relevant information other than use_long_term_reference_flag in the current sequence. When use_long_term_reference_flag specifies that an LTRP is present in the current sequence, the video encoder may additionally transmit long-term reference picture set-relevant information other than use_long_term_reference_flag for the current sequence to the video decoder.

When the LTRP flag information is transmitted in the unit of sequences, it may be determined in the unit of sequences whether an LTRP is present. That is, the value set as use_long_term_reference_flag may not be changed in a sequence. Accordingly, when it is determined whether an LTRP is present in a current sequence, this determination result may be maintained in the current sequence without being changed picture by picture. In this case, since the video encoder transmits only one piece of LTRP flag information for one sequence, it is possible to reduce the amount of information transmitted from the video encoder to the video decoder. Since the video decoder may not check whether an LTRP is present for each picture, it is possible to reduce complexity.

On the other hand, as described above, the name of the syntax element defined in the SPS as in the example shown in Table 1 is arbitrary and the LTRP flag information may be expressed by a syntax element having another name. For example, the LTRP flag information may be expressed by long_term_ref_pics_present_flag instead of use_long_term_reference_flag.

When an LTRP in the current sequence is used for inter prediction on the basis of use_long_term_reference_flag defined in the SPS, each picture (and/or slices) in the current sequence may be used or set as an LTRP. In this case, the video encoder may transmit flag information specifying whether a picture to which a current slice belongs is used as an LTRP to the video decoder. An LTRP identification number such as LTRP_Id may be allocated to all the pictures used as an LTRP. In this way, when LTRP-relevant information is transmitted on the basis of the LTRP identification number, the relevant information may be defined in a slice header. At this time, the LTRP-relevant information transmitted through the slice header may be used to construct a long-term reference picture set. Examples of the LTRP-relevant information defined in the slice header will be described below.

Table 2 shows an example of the LTRP-relevant information defined in the slice header.

TABLE 2

| | Descriptor |
|---|---|
| Slice_header( ) { | |
| ... | |
| If ((slice_type == I && use_long_term_reference_flag == 1) { | |
|   LTRP_flag | f(1) |
|   if( LTRP_flag = = 1 ) { | |
|     LTRP_Id | ue(v) |
|     log2_OLC_msb_minus4 | ue(v) |
|     OLC_cnt | ue(v) |
|   } | |
| } | |
| ... | |
| } | |

In the example shown in Table 2, slice type may specify a slice type of a current slice. LTRP_flag may specify whether a current picture to which the current slice belongs is used as an LTRP. For example, when LTRP_flag equal 0, LTRP_flag may specify that the current picture is not used as an LTRP. When LTRP_flag equal 1, LTRP_flag may specify that the current picture is used as an LTRP. Referring to Table 2, LTRP_flag may be transmitted when the current slice is an I slice (or the current picture is an I picture) and an LTRP is present in the current sequence, that is, when an LTRP in the current sequence is used for inter prediction.

When LTRP_flag equal 1, that is, when the current picture is used as an LTRP, additional information relevant to the LTRP may be transmitted through the slice header. Referring to Table 2, when the current picture is used as an LTRP, LTRP_Id, log 2_OLC_msb_minus4, and OLC_cnt may be transmitted in a state where it is included in the slice head.

Here, LTRP_Id may specify an LTRP identification number of the current picture. At this time, two or more LTRPS having the same LTRP_Id may not be present in the DPB, and only one LTRP for one value of LTRP_Id may be present in the DPB. For example, an LTRP having the same value of LTRP_Id allocated to the current picture may be present already in the DPB. In this case, the LTRP having the same value of LTRP_id present already in the DPB before the current picture is stored in the DPB may be marked as "unused for reference".

In the example shown in Table 2, when LTRP_flag equal 1, information for deriving an output latency count (OLC) of the current picture used as an LTRP in addition to LTRP_Id may be transmitted through the slice header. Here, the OLC may specify how long the LTRP should be stored in the DPB, that is, the time in which the LTRP should be stored in the DPB.

OLC-relevant information defined in the slice header and transmitted to the video decoder may be least significant bit (LSB) information and most significant bit (MSB) information corresponding to the OLC. Here, the LSB may specify at least one bit located at the lowest position in a bit sequence of binary numerals specifying the OLC. At this time, the MSB may correspond to a difference between the OLC and the LSB and may include upper bits other than the LSB in the bit sequence of binary numerals specifying the OLC. The LSB and the MSB may be determined by the video encoder. When the LSB and the MSB are used, the amount of bits transmitted from the video encoder to the video decoder may be reduced in comparison with a case where the OLC itself is transmitted.

In the example shown in Table 2, log 2_OLC_msb_minus4 may correspond to a value obtained by subtracting 4 from the number of bits used or set for the MSB (for example, OLC_msb) of the OLC. That is, log 2_OLC_msb_minus4+4 may specify the number of bits used or set for the MSB of the OLC. When log 2_OLC_msb_minus4 is transmitted, the video decoder may derive the MSB value of the OLC using Expression 1.

$$OLC\_msb = 2^{log\ 2\_OLC\_msb\_minus4+4}$$ [Expression 1]

In the example shown in Table 2, OLC_cnt may specify the LSB corresponding to the OLC of the current picture used as an LTRP. When OLC_msb and OLC_cnt are determined, the OLC of the current picture used as an LTRP may be derived using Expression 2.

$$OLC(CurrPic) = OLC\_msb + OLC\_cnt$$ [Expression 2]

Here, OLC(CurrPic) may specify the OLC of the current picture used as an LTRP.

The LTRP to which the OLC is allocated may be deleted from the memory (for example, the DPB) when the time corresponding to the OLC elapses. Therefore, a picture which is already deleted and which is not available as a reference picture for inter prediction of the current picture may be present in the LTRPs stored in the memory before the current picture is decoded. Such an LTRP may be marked as "unused for reference" depending on a predetermined condition. For example, the LTRP may be marked as "unused for reference" when the condition of Expression 3 is satisfied.

$$POC(LTRP) + OLC(LTRP) <= POC(CurrPic)$$ [Expression 3]

Here, POC(LTRP) indicates the POC of the LTRP. OLC (LTRP) may be an OLC specifying how long the LTRP is stored in the DPB.

Table 3 shows another example of the LTRP-relevant information defined in the slice header.

TABLE 3

| | Descriptor |
|---|---|
| Slice header( ) { | |
| ... | |
| If ((slice_type == I && use_long_term_reference_flag == 1) { | |
|   LTRP_flag | f(1) |
|   if( LTRP_flag == 1 ) { | |
|     LTRP_Id | ue(v) |
|   } | |
| } | |
| ... | |
| } | |

Referring to Table 3, LTRP_flag and LTRP_Id may be defined in a slice header. That is, in the example shown in Table 3, flag information specifying whether the current picture to which the current slice belongs is used as an LTRP and information on the LTRP identification number of the current picture may be transmitted to the video decoder in a state where it is included in the slice header, similarly to the example shown in Table 2. However, the information on the OLC of the current picture used as an LTRP may not be included in the slice header. In this case, the information on the OLC may not be transmitted to the video decoder. LTRP_flag and LTRP_Id are described above in the example shown in Table 2, and thus will not be specifically described herein.

Table 4 shows another example of the LTRP-relevant information defined in the slice header.

TABLE 4

| | Descriptor |
|---|---|
| Slice_header( ) { | |
| ... | |
| If ((nal_ref_flag == 1 && use_long_term_reference_flag == 1) { | |
|   LTRP_flag | f(1) |
|   if( LTRP_flag == 1 ) { | |
|     LTRP_Id | ue(v) |
|     log2_OLC_msb_minus4 | ue(v) |
|     OLC_cnt | ue(v) |
|   } | |

TABLE 4-continued

| | Descriptor |
|---|---|
| } | |
| ... | |
| } | |

Referring to Table 4, LTRP-flag, LTRP_Id, log 2_OLC_msb_minus4, and OLC_cnt may be defined in a slice header. That is, in the example shown in Table 4, flag information specifying whether the current picture to which the current slice belongs is used as an LTRP, information on the LTRP identification number of the current picture, and information on the OLC of the current picture may be transmitted to the video decoder in a state where it is included in the slice header, similarly to the example shown in Table 2.

However, in the example shown in Table 4, unlike Table 2, all the slices (and/or pictures) as well as the I slice (and/or I picture) may be used as an LTRP. Therefore, LTRP_flag and LTRP_Id may be transmitted regardless of whether the current slice is an I slice. That is, in the example shown in Table 2, LTRP_Id may be allocated to the current picture regardless of whether the current slice is an I slice.

LTRP-flag, LTRP_Id, log 2_OLC_msb_minus4, and OLC_cnt are described above in the example shown in Table 2, and thus will not be specifically described herein.

Table 5 shows another example of the LTRP-relevant information defined in the slice header.

LTRP_flag and LTRP_Id are described above in the example shown in Table 4, and thus will not be specifically described herein.

When LTRP_Id is allocated to the respective pictures used as an LTRP in any example shown in Tables 2 to 5, the video decoder may determine LTRPs constituting a long-term reference picture set on the basis of the values of LTRP_Id allocated to the pictures.

LTRP_Id may be usefully used particularly in the course of explicit reference picture signaling (hereinafter, referred to as ERPS). When the POC of an LTRP is directly transmitted in the course of ERPS or a POC difference between the current picture and the LTRP is transmitted, the amount of information to be transmitted may be very large. When the LTRP-relevant information is transmitted on the basis of LTRP_Id, the amount of information to be transmitted may be reduced and the above-mentioned problem may be solved.

When LTRP_Id allocated to the respective pictures (and/or slices) is transmitted as in the examples shown in Tables 2 to 5, information for constructing a long-term reference picture set may be defined on the basis of LTRP_Id in the slice header of a slice to be decoded. When the ERPS method is used, the LTRP-relevant information should be signaled independently of the STRP-relevant information. Therefore, LTRP-relevant syntax elements for constructing the long-term reference picture set may be defined independently of STRP-relevant syntax elements in the slice header. Table 6 shows an example of a sliced header including information for constructing a long-term reference picture set based on LTRP_Id.

TABLE 5

| | Descriptor |
|---|---|
| Slice header( ) { | |
| ... | |
| If ((nal_ref_flag == 1 && use_long_term_reference_flag == 1) { | |
|   LTRP_flag | f(1) |
|   if( LTRP flag = = 1 ) { | |
|     LTRP_Id | ue(v) |
|   } | |
| } | |
| ... | |
| } | |

Referring to Table 5, LTRP_flag and LTRP_Id may be defined in a slice header. That is, in the example shown in Table 5, flag information specifying whether the current picture to which the current slice belongs is used as an LTRP and information on the LTRP identification number of the current picture may be transmitted to the video decoder in a state where it is included in the slice header, similarly to the example shown in Table 4. However, the information on the OLC of the current picture used as an LTRP may not be included in the slice header. In this case, the information on the OLC may not be transmitted to the video decoder.

TABLE 6

| | Descriptor |
|---|---|
| Slice_header( ) { | |
| ... | |
| If ((slice_type == P ‖ slice_type == B) && explicit_ref_pic_signaling_flag == 1) { | |
|   ref_pic_pattern_idc | ue(v) |
|   if( ref_pic_pattern_type = = 0 ) { | |
|     number_of_ref_frame_minus1 | ue(v) |
|     for( i = 0; i < number_of_ref_pic_minus1 + 1; i++ ) { | |

TABLE 6-continued

|  | Descriptor |
|---|---|
|         sign_bit_of_ref_frame[i] | f(1) |
|         abs_ref_frame[ i ] | ue(v) |
|       } | |
|    } else { | |
|       for( i = 0; i < ref_pattern [ref_pic_pattern_idc −1][0] + 1; i++ ) { | |
|         Sign_bit_ref_frame[ i ] = | |
|           sign_bit_of_ref_pattern[ref_pic_pattern_idc −1][i + 1] | |
|         abs_ref_frame[ i ]= | |
|           abs_ref_pattern[ref_pic_pattern_idc −1][i + 1] | |
|       } | |
|    } | |
|    If (use_long_term_reference_flag == 1) { | |
|       num_used_long_term_pics | ue(v) |
|       if (num_used_long_term_pics > 0) { | |
|         for (i = 0; i < num_used_long_term_pics; i++) { | |
|           used_LTRP_Id [i] | ue(v) |
|         } | |
|       } | |
|    } | |
| } | |
| ... | |
| } | |

Table 6 shows a method of signaling LTRP-relevant information through the slice header when the ERPS method is used. num_used_long_term_pics and used_LTRP_Id[i] may be defined in the slice header shown in Table 6. That is, in the example shown in Table 6, num_used_long_term_pics and used_LTRP_Id[i] may be transmitted to the video decoder in a state where they are included in the slice header. Referring to Table 6, num_used_long_term_pics and used_LTRP_Id[i] may be transmitted to the video decoder when use_long_term_reference_flag described in the example shown in Table 1 equal 1, that is, when an LTRP in the current sequence is used for inter prediction.

Here, num_used_long_term_pics indicates the number of LTRPs necessary for inter prediction of the current picture. In addition, used_LTRP_Id[i] (where i is an integer of 0 or greater) may specify the LTRP identification number of the i-th (or (i+1)-th) LTRP used for inter prediction of the current picture. The video decoder may use pictures (and/or slice) indicated by used_LTRP_Id[i] as LTRPs of the current picture and/or the current slice). For example, the long-term reference picture set in this case may include the pictures indicated by used_LTRP_Id[i]. At this time, the video decoder may construct the long-term reference picture set by allocating the pictures indicated by used_LTRP_Id[i] in the ascending order of i magnitudes. The course of constructing a reference picture list on the basis of the long-term reference picture set is described above with reference to FIG. 4 and thus will not be repeatedly described.

In the example shown in Table 6, the LTRPs used for inter prediction of the current picture are indicated by used_LTRP_Id[i], but the present invention is not limited to this configuration. For example, a picture used asn an LTRP may be indicated by the POC of the LTRP or the LSB and the MSB corresponding to the POC. Specific examples thereof will be described later.

The slice header including information (for example, used_LTRP_Id[i]) for constructing the long-term reference picture set on the basis of LTRP_Id is not limited to the above-mentioned examples. In the example shown in Table 6, syntax elements other than the syntax elements (for example, use_long_term_reference_flag, num_used_long_term_pics, and used_LTRP_Id[i]) for signaling the LTRP-relevant information based on the ERPS method may be applied in different ways depending on implementation and/or necessity.

On the other hand, in the above-mentioned examples, when an LTRP in the current sequence is used for inter prediction, the LTRP-relevant information other than use_long_term_reference_flag is transmitted through the slice header. However, a part of the LTRP-relevant information may be transmitted to the video decoder in a state where it is included in a picture parameter set (PPS).

Table 7 shows an example of the LTRP-relevant information defined in a PPS.

TABLE 7

|  | Descriptor |
|---|---|
| pic_parameter_set_rbsp ( ) { | |
|   ... | |
|   if (use_long_term_reference_flag) { | |
|     num_long_term_pics_list | ue(v) |
|     If (num_long_term_pics_list > 0) { | |
|       ltrp_poc_len_minus4 | ue(v) |
|       for (i = 0; i < num_long_term_pics_list; i++) { | |
|         ltrp_poc [ i ] | u(v) |
|       } | |
|     } | |
|   } | |
|   ... | |
| } | |

In the example shown in Table 7, num_long_term_pics_list may specify the number of slices referring to the current PPS, that is, the number of candidate LTRPs which can be used in the slices included in the current picture. Referring to Table 7, num_long_term_pics_list may be transmitted to the video decoder in a state where it is included in the slice header when use_long_term_reference_flag equal 1.

In the following description, a candidate LTRP which can be used in a slice referring to the current PPS, that is, a candidate LTRP specified in the PPS, is referred to as "PPS candidate LTRP" for the purpose of convenience of explanation.

ltrp_poc_len_minus4 may specify a value obtained by subtracting 4 from the number of bits necessary for expressing a syntax element ltrp_poc[i]. That is, "ltrp_poc_len_minus4+4" may specify the number of bits necessary for expressing the syntax element ltrp_poc[i]. ltrp_poc[i] (where i is an integer of 0 or greater) may specify the POC (for example, the absolute value of the POC) of the i-th (or (i+1)-th) PPS candidate LTRP out of the PPS candidate LTRPs. That is, the pictures used as the PPS candidate LTRP may be indicated by ltrp_poc[i]. For example, the number of bits for expressing ltrp_poc[i] may be "ltrp_poc_len_minus4+4". Referring to Table 7, ltrp_poc_len_minus4 and ltrp_poc[i] may be transmitted to the video decoder in a state where they are included in the slice header when the value of num_long_term_pics_list equal 0, that is, when the number of PPS candidate LTRPs is greater than 0.

As in the example shown in Table 7, when the information on the PPS candidate LTRP is transmitted through the PPS, the LTRP to be used to construct a long-term reference picture set may be determined on the basis of the PPS candidate LTRP at the level of slice. Accordingly, information for determining the LTRP to be used to construct a long-term reference picture set on the basis of the PPS candidate LTRP may be defined in the slice header. Table 8 shows an example of information to be transmitted through a slice header when the PPS candidate LTRP is determined as in the example shown in Table 7.

TABLE 8

| | Descriptor |
|---|---|
| slice_header( ) { | |
| ... | |
| if(use_long_term_reference_flag) { | |
| num_long_term_pics | ue(v) |
| for( i = 0; i < num_long_term_pics; i++ ) { | |
| ltrp_idx[ i ] | ue(v) |
| used_by_curr_pic_lt_flag[ i ] | u(1) |
| } | |
| } | |
| ... | |
| } | |

In the slice header shown in Table 8, num_long_term_pics, ltrp_idx[i], and used_by_curr_pic_lt_flag[i] may be defined. Referring to Table 8, num_long_term_pics, ltrp_idx[i], and used_by_curr_pic_lt_flag[i] may be transmitted to the video decoder when the value of use_long_term_reference_flag described in conjunction with the example shown in Table 1 equal 1, that is, when the LTRP in the current sequence is used to inter prediction.

num_long_term_pics may specify the number of LTRPs to be included in the long-term reference picture set of the current picture. num_long_term_pics may have a value in a range of "0" to "max_num_ref_frames−NumNegativePics[StRpsIdx]−NumPositivePics[StRpsIdx]". Here, max_num_ref_frames may specify the maximum number of reference pictures to be stored in the DPB. NumNegativePics[StRpsIdx] may specify the number of forward short-term reference pictures and NumPositivePics[StRpsIdx] may specify the number of backward short-term reference pictures. num_long_term_pics may have a value which is included in the above-mentioned range and which is included in a range of "0" to "num_long_term_pics_list" (or "num_long_term_pics_list−1"). As described above, num_long_term_pics_list may specify the number of PPS candidate LTRPs. When num_long_term_pics is not present, the value of num_long_term_pics may be considered or estimated to be 0.

ltrp_idx[i] (where i is an integer of 0 or greater) may specify the index of the i-th (or (i+1)-th) LTRP used for inter prediction of the current picture (and/or the current slice) out of the indices of the PPS candidate LTRPs. Accordingly, the video decoder may determine the PPS candidate LTRPs to be used as the LTRP of the current picture on the basis of ltrp_idx[i] transmitted through the slice header. In this case, since the information on the POC can be indexed, it is possible to reduce the amount of information transmitted from the video encoder to the video decoder.

Here, the index of a PPS candidate LTRP may mean i in the syntax element ltrp_idx[i] defined in the PPS shown in Table 7. Therefore, the POC of the i-th (or (i+1)-th) LTRP used for inter prediction of the current picture (and/or the current slice) in this case may be ltrp_poc[ltrp_idx[i]].

used_by_curr_pic_lt_flag[i] may specify whether the i-th LTRP indicated by the ltrp_idx[i] is used as a reference picture for the current picture. For example, when ltrp_idx[i] equal 1, the i-th LTRP may be used as a reference picture for the current picture. However, when ltrp_idx[i] equal 0, the i-th LTRP may not be used as a reference picture for the current picture.

In the example shown in Table 8, the video decoder may use the LTRPs in which used_by_curr_pic_lt_flag[i] is set to 1 out of the LTRPs indicated by ltrp_idx[i] to construct a long-term reference picture set. For example, the video decoder may construct the long-term reference picture set by allocating the LTRPs in which used_by_curr_pic_lt_flag[i] equal 1 out of the LTRPs indicated by ltrp_idx[i] in the ascending order of magnitudes of i. The course of constructing a reference picture list on the basis of the long-term reference picture set is described above with reference to FIG. 4 and thus will not be repeatedly described herein.

On the other hand, in the course of constructing a reference picture set and/or constructing a reference picture list, each reference picture may be marked as "unused for reference", "used for short-term reference", or "used for long-term reference". For example, a picture not used to construct a reference picture set may be marked as "unused for reference". An STRP constituting a short-term reference picture set may be marked as "used for short-term reference", an LTRP constituting a long-term reference picture set may be marked as "used for long-term reference".

As described above, ltrp_poc[i] specifying the POC (for example, the absolute value of the POC) of a PPS candidate LTRP may be defined in the PPS. Accordingly, when the video encoder determines that an arbitrary reference picture should be set as a new LTRP, a new PPS including the POC information of the PPS candidate LTRP determined on the basis of the new LTRP should be transmitted to the video decoder. In this case, for example, the POC of the new LTRP may be included and considered in a table for mapping the POC information of the PPS candidate LTRP.

At this time, an LTRP not indicated by ltrp_idx[i] of the slice header (an LTRP not included in the slice header) may be present in the PPT candidate LTRPs indicated by ltrp_poc[i] defined in the PPS (LTRPs included in the PPS). At this time, an LTRP which belongs to the PPS candidate LTRPs included in the PPS and which is not included in the slice header may be marked as "unused for reference".

When an LTRP in the current bit stream is includes the slice header of the current picture but is not included in a slice header of a picture having a POC smaller than that of the current picture, the corresponding bit stream may be considered as illegal.

On the other hand, as described in conjunction with the example shown in Table 1, the LTRP flag information in the unit of SPS defined in the SPS may be expressed by long_term_ref_pics_present_flag instead of use_long_term_reference_flag. In this case, the LTRP flag information defined in the SPS may be expressed as in the example shown in Table 9.

TABLE 9

| | Descriptor |
|---|---|
| seq_parameter_set_rbsp( ) { | |
| ... | |
|    long_term_ref_pics_present_flag | u(1) |
| ... | |
| } | |

In the example shown in Table 9, long_term_ref_pics_present_flag may specify whether an LTRP in a currently-encoded video sequence is used for inter prediction of at least one encoded picture, that is, whether an LTRP in the current sequence is used. For example, when long_term_ref_pics_present_flag equal to 0, the flag may specify that an LTRP in the currently-encoded video sequence is not used for inter prediction of any encoded picture. In this case, a picture used as an LTRP may not be present in the currently-encoded video sequence. When long_term_ref_pics_present_flag equal to 1, the flag may specify that an LTRP in the currently-encoded video sequence is used for inter prediction of at least one encoded picture.

In the example shown in Table 9, when long_term_ref_pics_present_flag indicates that an LTRP in the currently-encoded video sequence is not used for inter prediction, the video encoder may not transmit long-term reference picture-relevant information other than long_term_ref_pics_present_flag to the video decoder. Accordingly, the video decoder may neither receive nor process the long-term reference picture-relevant information other than long_term_ref_pics_present_flag.

When an LTRP in the current sequence is used for inter prediction on the basis of long_term_ref_pics_present_flag defined in the SPS of Table 9, other long-term reference picture set-relevant information may be defined in the sliced header. In this case, the video encoder may transmit the long-term reference picture-relevant information other than long_term_ref_pics_present_flag to the video decoder through the slice header. Table 10 shows an example of the long-term reference picture-relevant information transmitted through a slice header when long_term_ref_pics_present_flag is transmitted through the SPS as in Table 9.

TABLE 10

| | Descriptor |
|---|---|
| slice_header( ) { | |
| ... | |
|   if( long_term_ref_pics_present_flag ) { | |
|     num_long_term_pics | ue(v) |
|     for( i = 0; i < num_long_term_pics; i++ ) { | |
|       poc_lsb_lt[ i ] | u(v) |
|       delta_poc_msb_present_flag[ i ] | u(1) |
|       if( delta_poc_msb_present_flag[ i ] ) | |
|         delta_poc_msb_cycle_lt[ i ] | ue(v) |
|       used_by_curr_pic_lt_flag[ i ] | u(1) |
|     } | |

TABLE 10-continued

| | Descriptor |
|---|---|
|   } | |
| ... | |
| } | |

In the slice header shown in Table 10, num_long_term_pics, poc_lsb_lt[i], delta_poc_msb_present_flag[i], delta_poc_msb_cycle_lt[i], and used_by_curr_pic_lt_flag[i] may be defined. In the example shown in Table 10, when long_term_ref_pics_present_flag equal to 1, that is, when an LTRP in the current sequence is used for inter prediction, num_long_term_pics, poc_lsb_lt[i], delta_poc_msb_present_flag[i], delta_poc_msb_cycle_lt[i], and used_by_curr_pic_lt_flag[i] may be transmitted to the video decoder in a state where they are included in the slice header.

num_long_term_pics may specify the number of LTRPs to be included in a long-term reference picture set of the current picture. Here, the LTRPs to be included in the long-term reference picture set may be pictures stored in the DPB before the current slice is decoded.

In the example shown in Table 10, the POC of the LTRPs to be included in the long-term reference picture set may be specified on the basis of information relevant to the LSB and the MSB corresponding to the POC. Here, the LSB relevant information (poc_lsb_lt[i]) and the MSB relevant information (delta_poc_msb_present_flag[i] and delta_poc_msb_cycle_lt[i]) may be transmitted from the video encoder to the video decoder. In the following description, for the purpose of convenience of explanation, the LSB of a POC is referred to as a POC LSB, and the MSB of a POC is referred to as a POC MSB.

The POC LSB may specify at least one bit located at the lowest position in a bit sequence of binary numerals specifying the POC of the reference pictures. The POC MSB may correspond to the difference between the POC and the LSB and may include higher bits other than the POC LSB in the bit sequence of binary numerals specifying the POC. Here, the POC LSB and the POC MSB may be determined by the video encoder and may be transmitted to the video decoder. When the POC LSB and the POC MSB are used, it is possible to reduce the amount of bits transmitted from the video encoder to the video decoder, compared with a case where the POC itself is transmitted.

The video encoder may transmit information on the maximum value of the LSB corresponding to the POC to the video decoder. At this time, the information may specify the maximum number of bits used for the LSB. For example, the information on the maximum value of the LSB may be transmitted to the video decoder in a state where it is included in the SPS, and may be indicated by log 2_max_pic_order_cnt_lsb_minus4. Here, log 2_max_pic_order_cnt_lsb_minus4 may correspond to a value obtained by subtracting 4 from the maximum number of bits used for the LSB. When log 2_max_pic_order_cnt_lsb_minus4 is received, the video decoder may derive the maximum value of the LSB of the POC using Expression 4.

$$\text{MaxPicOrderCntLsb} = 2^{(\log 2\_max\_pic\_order\_cnt\_lsb\_minus4+4)} \quad \text{[Expression 4]}$$

Here, MaxPicOrderCntLsb may mean the maximum value of the LSB corresponding to the POC.

poc_lsb_lt[i] (where i is an integer of 0 or greater) may specify the POC LSB of the i-th candidate LTRP to be included in the long-term reference picture set of the current picture. That is, the POC LSB of the LTRP may be specified by poc_lsb_lt[i].

delta_poc_msb_present_flag[i] may specify whether delta_poc_msb_cycle_lt[i] is present. That is, the video encoder may transmit flag information specifying whether MSB information for distinguish the POC MSB of the LTRP is present to the video decoder. For example, when there is no possibility that two or more LTRPs having the same POC LSB value will be present, the flag may be set to 0. Otherwise, the flag may be set to 1.

Referring to Table 10, when delta_poc_msb_present_flag [i] equal to 1, that is, when the MSB information for distinguishing the POC MSB of the LTRP is present, delta_poc_msb_cycle_lt[i] may be transmitted to the video decoder in a state where it is included in the slice header. delta_poc_msb_cycle_lt[i] may be used to determine the MSB of the POC of the i-th candidate LTRP to be included in the long-term reference picture set of the current picture. That is, the MSB of the POC of the i-th candidate LTRP may be determined on the basis of delta_poc_msb_cycle_lt[i] using a predetermined calculation.

When the POC LSB and/or the POC MSB is determined through poc lsblt[i], delta_poc_msb_present_flag[i], and/or delta_poc_msb_cycle_lt[i], the video decoder may derive the POC of the i-th candidate LTRP to be included in the long-term reference picture set of the current picture on the basis thereof.

In the example shown in Table 10, used_by_curr_pic_lt_flag[i] may specify whether the i-th candidate LTRP is used as a reference picture of the current picture (and/or the current slice). For example, when used_by_curr_pic_lt_flag [i] equal to 0, the i-th candidate LTRP may not be used as a reference picture of the current picture (and/or the current slice). At this time, the i-th candidate LTRP may not be included in the long-term reference picture set used to construct a reference picture list.

In the example shown in Table 10, the video decoder may use the LTRPs indicated by the POC derived on the basis of the POC LSB and/or the POC MSB to construct the long-term reference picture set. For example, the video decoder may construct the long-term reference picture set by allocating the LTRPs other than the LTRP in which used_by_curr_pic_lt_flag[i] equal 0 out of the LTRPs derived on the basis of the POC LSB and/or the POC MSB in the ascending order of magnitudes of i. The process of constructing a reference picture list on the basis of the long-term reference picture set is described above with reference to FIG. 4 and description thereof will not be repeated herein.

In the examples shown in Tables 9 and 10, when an LTRP is used for inter prediction, the LTRPs stored in the DPB may be signaled using the POC LSB (for example, poc_lsb_lt[i]) through the slice header. However, when the POC LSB is transmitted for each slice, the same POC LSB value in one sequence may be repeatedly transmitted and thus there may be a problem in signaling efficiency of LTRP-relevant information.

In the example shown in Table 10, since u(v) is allocated as a descriptor to poc_lsb_lt[i], a "fixed length encoding" method based on a fixed number of bits v (where v is a natural number) may be applied to poc_lsb_lt[i]. In this case, the number of bits used to encode poc_lsb_lt[i] in the current sequence may not be changed. Here v may be determined by log 2_max_pic_order_cnt_lsb_minus4 defined in the SPS. As described above, "log 2_max_pic_order_cnt_lsb_minus4+4" may indicate the maximum number of bits used for the LSB. Therefore, the number of bits used to encode poc_lsb_lt[i] may correspond to the maximum number of bits of the POC LSB.

However, since an LTRP has a feature that it is not changed in a long period, the number of the POC LSB values of the LTRPs used for the actual encoding/decoding process may not be large. It may be inefficient that the maximum number of bits is allocated to signal the POC LSB of the LTRP in this situation.

Therefore, an LTRP signaling method for solving the problem occurring in the examples shown in Tables 9 and 10 may be provided. Examples of the LTRP signaling method for solving the above-mentioned problem will be described below.

As described above, an LTRP has a feature that it is stored in the DPB and is not changed in a very long period. Therefore, it may be redundant to transmit the same POC LSB value for each slice header. Accordingly, in order to improve signaling efficiency, the POC LSB values having a high possibility to be used as the POC LSB may be transmitted to the video decoder in a state where they are included in the SPS.

In the following description, the POC LSB included through the SPS is referred to as "SPS POC LSB". Here, plural POC LSBs to be transmitted through the SPS may be considered to construct one set and this set may be referred to as an "SPS POC LSB set" or an "SPS LSB set" in the following description. Since the POC LSB to be transmitted through the SPS corresponds to the LTRP, the POC LSB to be transmitted through the SPS may be referred to as an "SPS candidate LTRP" in the following description. Plural SPS candidate LTRPs to be transmitted through the SPS may be considered to construct an "SPS candidate LTRP list".

When the POC LSB of an LTRP to be signaled through the slice is the same as the SPS POC LSB to be transmitted through the SPS, an index specifying the SPS POC LSB may be transmitted through the slice instead of the POC LSB of the LTRP. Therefore, in this case, it is possible to reduce the amount of bits necessary for signaling the POC LSB of the LTRP.

Table 11 shows an example of an SPS including information on the SPS POC LSB.

TABLE 11

| | Descriptor |
|---|---|
| seq_parameter_set_rbsp( ) { | |
| ... | |
|   long_term_ref_pics_present_flag | u(1) |
|   if( long_term_ref_pics_present_flag ) { | |
|     num_long_term_ref_pics_sps | ue(v) |
|     for( i = 0; i < num_long_term_ref_pics_sps; i++ ) | |
|       lt_ref_pic_poc_lsb_sps[ i ] | u(v) |
|   } | |
|   ... | |
| } | |

Referring to Table 11, long_term_ref_pics_present_flag may be defined in the SPS. That is, the video encoder may transmit long_term_ref_pics_present_flag to the video decoder through the SPS. This flag is the same as described above in conjunction with the example shown in Table 9 and specific description thereof will not be repeated.

When long_term_ref_pics_present_flag equal to 1, that is, when an LTRP in the current sequence is used for inter prediction, num_long_term_ref_pics_sps and lt_ref_pic_poc_lsb_sps[i] may be transmitted to the video decoder in a state where they are included in the SPS.

num_long_term_ref_pics_sps may specify the number of SPS candidate LTRPs to be specified or transmitted through the SPS. That is, the video encoder may transmit information on the number of POC LSBs having a high possibility to be used as the POC LSB of the LTRP to the video decoder through the SPS. Here, for example, num_long_term_ref_pics_sps may have a value in a range of 0 to 32.

When num_long_term_ref_pics_sps equal a value greater than 0, that is, when the number of SPS candidate LTRPs to be transmitted through the SPS is greater than 0, lt_ref_pic_poc_lsb_sps[i] may be transmitted to the video decoder in a state where it is included in the SPS. lt_ref_pic_poc_lsb_sps[i] (where i is an integer of 0 or greater) may specify the POC LSB of the i-th SPS candidate LTRP to be specified or transmitted through the SPS. This may mean that the POC LSB set is transmitted through the SPS. Here, the number of bits necessary for expressing lt_ref_pic_poc_lsb_sps[i] may be "log 2_max_pic_order_cnt_lsb_minus4+4". log 2_max_pic_order_cnt_lsb_minus4 is described above and thus specific description thereof will not be repeated herein.

When the information on the SPS POC LSB is transmitted through the SPS as described above in conjunction with the example shown in Table 11, the LTRP-relevant information defined in the slice header may be expressed, for example, by Table 12.

TABLE 12

|  | Descriptor |
|---|---|
| slice_header( ) { | |
| ... | |
| if( long_term_ref_pics_present_flag ) { | |
|   num_long_term_pics | ue(v) |
|   if( num_long_term_ref_pics_sps > 0 ) | |
|     num_long_term_sps | ue(v) |
|   for( i = 0; i < num_long_term_sps + num_long_term_pics; i++ ) { | |
|     if ( i < num_long_term_sps ) | |
|       lt_idx_sps[ i ] | u(v) |
|     else | |
|       poc_lsb_lt[ i ] | u(v) |
|     delta_poc_msb_present_flag[ i ] | u(1) |
|     if( delta_poc_msb_present_flag[ i ] ) | |
|       delta_poc_msb_cycle_lt[ i ] | ue(v) |
|     used_by_curr_pic_lt_flag[ i ] | u(1) |
|   } | |
| } | |
| ... | |
| } | |

When long_term_ref_pics_present_flag equal to 1, that is, when an LTRP in the current sequence is used for inter prediction, the LTRP-relevant information may be transmitted through the slice header.

In the example shown in Table 12, num_long_term_sps may specify the number of SPS candidate LTRPs to be included in the long-term reference picture set of the current picture (and/or the current slice). That is, when the number of SPS POC LSBs to be transmitted through the SPS is greater than 0, the video encoder may transmit information on the number of SPS candidate LTRPs to be included in the long-term reference picture set of the current picture to the video decoder. In this case, the SPS candidate LTRPs to be included in the long-term reference picture set of the current picture (and/or the current slice) may be pictures stored in the DPB before the current slice is decoded.

When num_long_term_sps is not present, the value of num_long_term_sps may be inferred or estimated to be 0. num_long_term_sps may have a value in a range of "0" to "Min(num_long_term_ref_pics_sps, max_dec_pic_buffering[max_temporal_layers_minus1]−NumNegativePics[StRpsIdx]−NumPositivePics[StRpsIdx]−num_long_term_pics)". Here, max_dec_pic_buffering[max_temporal_layers_minus1] may specify the maximum number of reference pictures to be stored in the DPB. num_long_term_ref_pics_sps, NumNegativePics[StRpsIdx], and NumPositivePics[StRpsIdx] are described above and thus description thereof will not be repeated herein.

In the example shown in Table 12, num_long_term_pics may specify the number of LTRPs which are directly signaled or specified through the current slice header as the LTRPs to be included in the long-term reference picture set of the current picture (and/or the current slice). That is, the video encoder may transmit the information on the number of LTRPs other than the SPS candidate LTRPs (or not referring the SPS candidate LTRPs) as the LTRPs to be included in the long-term reference picture set of the current picture (and/or the current slice) to the video decoder. In this case, the LTRPs to be included in the long-term reference picture set of the current picture (and/or the current slice) may be pictures stored before the current slice is decoded.

When num_long_term_pics is not present, the value of num_long_term_pics may be inferred or estimated to be 0. num_long_term_pics may have a value in a range of "0" to "max_dec_pic_buffering[max_temporal_layers_minus1]−NumNegativePics[StRpsIdx]−NumPositivePics[StRpsIdx]−num_long_term_sps".

On the other hand, as described above, when the POC LSB of the LTRP to be signaled through the slice is the same as the SPS POC LSB to be transmitted through the SPS, an index specifying the SPS POC LSB may be transmitted through the slice instead of the POC LSB of the LTRP. That is, a list of LTRPs determined on the basis of the SPS POC LSB may be transmitted through the slice header.

Referring to Table 12, lt_idx_sps[i] (where i is an integer of 0 or greater) may indicate an index of a picture (SPS candidate LTRP) to be included as the i-th LTRP in the long-term reference picture set of the current picture among the pictures (SPS candidate LTRPs) included in the SPS candidate LTRP list. That is, lt_idx_sps[i] may specify an index in the SPS candidate LTRP list for identifying a picture to be included in the long-term reference picture set of the current picture. Accordingly, the video decoder may determine the SPS candidate LTRPs to be used as the LTRPs of the current picture on the basis of lt_idx_sps[i] transmitted through the slice header. In this case, since the information on the POC LSB can be indexed, it is possible to reduce the amount of information transmitted from the video encoder to the video decoder.

The index of an SPS candidate LTRP may mean i in a syntax element lt_ref_pic_poc_lsb_sps[i] defined in the SPS of Table 11. Accordingly, in this case, the POC LSB of the i-th candidate LTRP to be included in the long-term reference picture set of the current picture (and/or the current slice) may be lt_ref_pic_poc_lsb_sps[lt_idx_sps[i]].

lt_idx_sps[i] may have a value in a range of "0" to "num_long_term_ref_pics_sps−1". Here, the number of bits used to express lt_idx_sps[i] may be "ceil(log 2(num_long_term_ref_pics_sps))". Here, "ceil(X)" may be a minimum integer equal to or greater than X.

When the POC LSB of an LTRP to be signaled through the slice is not the same as the SPS POC LSB to be transmitted through the SPS, the POC LSB of the LTRP may be directly transmitted through the slice. That is, a list of LTRPs not determined on the basis of the SPS POC LSB may be additionally transmitted through the slice header.

Referring to Table 12, poc_lsb_lt[i] may specify the POC LSB of the i-th candidate LTRP to be included in the long-term reference picture set of the current picture. That is, the video encoder may directly or explicitly transmit the POC LSB of the LTRP to be included in the long-term reference picture set of the current picture to the video decoder through the slice header.

poc_lsb_lt[i] may have a value in a range of "0" to "MaxPicOrderCntLsb". Here, the number of bits used to express poc_lsb_lt[i] may be "log 2_max_pic_order_cnt_lsb_minus4+4".

In the example shown in Table 12, the POC LSBs of some LTRPs (hereinafter, referred to as first candidate LTRPs) out of the candidate LTRPs to be included in the long-term reference picture set of the current picture may be determined on the basis of the SPS POC LSB. The POC LSBs of the other LTRPs (hereinafter, referred to as second candidate LTRPs) out of the candidate LTRPs to be included in the long-term reference picture set of the current picture may be determined on the basis of poc_lsb_lt[i] explicitly transmitted through the slice header. At this time, the candidate LTRPs to be included in the long-term reference picture set of the current picture may be considered to include the first candidate LTRPs and the second candidate LTRPs. Accordingly, when the POC LSBs of the first candidate LTRPs and the POC LSBs of the second candidate LTRPs are all determined, it may be considered that all the POC LSBs of the candidate LTRPs to be included in the long-term reference picture set of the current picture are determined.

Referring to Table 12 again, information for deriving the POC MSBs of the candidate LTRPs to be included in the long-term reference picture set of the current picture may be transmitted through the slice header. The information for deriving the POC MSBs in the slice header may include delta_poc_msb_present_flag[i] and delta_poc_msb_cycle_lt[i].

delta_poc_msb_present_flag[i] may specify whether delta_poc_msb_cycle_lt[i] is present. That is, the video encoder may transmit flag information specifying whether MSB information for distinguishing the POC MSBs of the LTRPs to the video decoder.

For example, when there is no possibility that two or more LTRPs having the same POC LSB value will be percent, delta_poc_msb_present_flag[i] may be 0. At this time, this flag may specify that delta_poc_msb_cycle_lt[i] is not present. On the contrary, when two or more reference pictures having the same POC LSB value as poc_lsb_lt[i] are present in the DPB, delta_poc_msb_present_flag[i] may be 1. At this time, this flag may specify that delta_poc_msb_cycle_lt[i] is present. For example, it is assumed that j has an integer value which is not the same as i in the range of "0" to "num_long_term_pics−1". Then, when a value in which poc_lsb_lt[i] and poc_lsb_lt[j] are equal to each other is present in possible values of j, delta_poc_msb_present_flag[i] may be set to 1.

Referring to Table 12 again, when delta_poc_msb_present_flag[i] equal 1, delta_poc_msb_cycle_lt[i] may be transmitted to the video decoder in a state where it is included in the slice header. delta_poc_msb_cycle_lt[i] may be used to determine the POC MSB of the i-th candidate LTRP to be included in the long-term reference picture set of the current picture. That is, the POC MSB of the i-th candidate LTRP may be determined on the basis of delta_poc_msb_cycle_lt[i] using a predetermined calculation.

In the course of deriving the POC MSB, the video decoder may derive a variable DeltaPocMSBCycleLt[i] on the basis of delta_poc_msb_cycle_lt[i] transmitted from the video encoder. At this time, the POC MSB may be calculated on the basis of the value set as DeltaPocMSBCycleLt[i]. The step of deriving DeltaPocMSBCycleLt[i] may be expressed, for example, as follows.

```
if( i == 0 || poc_lsb_lt [ i − 1 ] ! = poc_lsb_lt [ i ] )
   DeltaPocMSBCycleLt[ i ] = delta_poc_msb_cycle_lt[ i ]
else
   DeltaPocMSBCycleLt[ i ] =
      delta_poc_msb_cycle_lt[ i ] +DeltaPocMSBCycleLt[ i − 1 ]
``` when the POC LSB and/or the POC MSB is determined using lt_idx_sps[i], poc_lsb_lt[i], delta_poc_msb_present_flag[i], and/or delta_poc_msb_cycle_lt[i], the video decoder may derive the POC of the i-th candidate LTRP to be included in the long-term reference picture set of the current picture on the basis thereof.

In the example shown in Table 12, used_by_curr_pic_lt_flag[i] may specify whether the i-th candidate LTRP to be included in the long-term reference picture set of the current picture is used as a reference picture of the current picture (and/or the current slice). For example, when used_by_curr_pic_lt_flag[i] equal 0, the i-th candidate LTRP may not be used as a reference picture of the current picture (and/or the current slice). At this time, the i-th candidate LTRP may not be included in the long-term reference picture set used to construct a reference picture list.

According to the example shown in Table 12, the video decoder may use the LTRPs specified by the POCs derived on the basis of the POC LSB and/or the POC MSB to construct the long-term reference picture set. For example, the video decoder may construct the long-term reference picture set by allocating the LTRPs other than the LTRPs in which used_by_curr_pic_lt_flag[i] equal 0 out of the candidate LTRPs derived on the basis of the POC LSB and/or the POC MSB in the ascending order of magnitudes of i. The course of constructing a reference picture list on the basis of the long-term reference picture set is described above with reference to FIG. 4 and description thereof will not be repeated herein.

Table 13 shows another example of the LTRP-relevant information defined in the slice header when the LTRP-relevant information is transmitted through the SPS as in the example shown in Table 11.

TABLE 13

|  | Descriptor |
|---|---|
| slice header( ) { | |
| ... | |
| if( long_term_ref_pics_present_flag ) { | |
| num_long_term_pics | ue(v) |
| if( num_long_term_ref_pics_sps > 0 ) | |
| num_long_term_sps | ue(v) |
| for( i = 0; i < num_long_term_sps + num_long_term_pics; i++ ) { | |
| if ( i < num_long_term_sps ) | |
| lt_idx_sps[ i ] | ue(v) |
| else | |
| poc_lsb_lt[ i ] | u(v) |
| delta_poc_msb_present_flag[ i ] | u(1) |
| if( delta_poc_msb_present_flag[ i ] ) | |
| delta_poc_msb_cycle_lt[ i ] | ue(v) |
| used_by_curr_pic_lt_flag[ i ] | u(1) |
| } | |
| } | |
| ... | |
| } | |

In the example shown in Table 12, u(v) is set as a descriptor of lt_idx_sps[i]. Accordingly, a "fixed length encoding" method based on a fixed number of bits v may be applied to lt_idx_sps[i]. However, since an LTRP has a feature that it is not changed in a very long period, it may be inefficient to apply the fixed length encoding to lt_idx_sps[i].

Therefore, an encoding method of adaptively determining a bit length may be applied to lt_idx_sps[i]. An example of the encoding method of adaptively determining a bit length may be an exponential golomb encoding method.

Referring to Table 13, ue(v) may be set as a descriptor of lt_idx_sps[i]. That is, lt_idx_sps[i] may be encoded and transmitted using ue(v) through the use of slice header. ue(v) may specify a syntax element to be encoded on the basis of the exponential golomb encoding method. Accordingly, in the example shown in Table 13, lt_idx_sps[i] may be encoded on the basis of an exponential golomb code and may be transmitted to the video decoder. Here, the exponential golomb code may be, for example, a 0-th order exponential golomb code.

When the fixed length encoding method is applied as in the example shown in Table 12, the number of bits used to express lt_idx_sps[i] may be "ceil(log 2(num_long_term_ref_pics_sps))". However, when the exponential golomb encoding method is used, the bit length may be variably determined on the basis of the exponential golomb code and thus the number of bits used to express lt_idx_sps[i] may be variable. Therefore, in the example shown in Table 13, the number of bits used to express lt_idx_sps[i] may not be "ceil(log 2(num_long_term_ref_pics_sps))".

Details of the LTRP-relevant information defined in the slice header in the example shown in Table 13 are the same as in the example shown in Table 12 except for the above-mentioned details and thus specific description thereof will not be repeated.

Table 14 shows another example of the SPS including information on the SPS POC LSB.

TABLE 14

| | Descriptor |
|---|---|
| seq_parameter_set_rbsp( ) { | |
| ... | |
| long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) { | |
| lt_ref_pic_poc_lsb_sps[ i ] | u(v) |
| used_by_curr_pic_lt_sps_flag[ i ] | u(1) |
| } | |
| } | |
| ... | |
| } | |

In the examples shown in Tables 11 to 13, it may be determined by used_by_curr_pic_lt_flag[i] transmitted through the use of a slice header whether the first candidate LTRPs (for example, the LTRPs in which the POC LSB is determined on the basis of the SPS POC LSB out of the candidate LTRPs to be included in the long-term reference picture set of the current picture) and the second candidate LTRPs (for example, the LTRPs in which the POC LSB is determined on the basis of poc_lsb_lt[i] explicitly transmitted through the slice header out of the candidate LTRPs to be included in the long-term reference picture set of the current picture) are used as reference pictures of the current picture. However, since the first POC LSBs of the first candidate LTRPs may be determined on the basis of the SPS POC LSB, it may be determined by a particular flag transmitted through the SPS whether the first candidate LTRPs are used as reference pictures of the current picture. That is, flag information specifying whether the SPS POC LSB is used as a reference picture of a picture (for example, the current picture) belonging to the SPS may be transmitted through the SPS.

Referring to Table 14, used_by_curr_pic_lt_sps_flag[i] (where i is an integer of 0 or greater) may specify whether the i-th SPS candidate LTRP is used as a reference picture of the picture using the i-th SPS candidate LTRP as the first candidate LTRP. For example, when used_by_curr_pic_lt_sps_flag[i] equal 0, the i-th SPS candidate LTRP may not be used as a reference picture of the picture using the i-th SPS candidate LTRP as the first candidate LTRP. At this time, the first candidate LTRP corresponding to the i-th SPS candidate LTRP may not be included in the long-term reference picture set used to construct a reference picture list.

Details of the LTRP-relevant information defined in the SPS in the example shown in Table 14 are the same as defined in the SPS of Table 11 except for the above-mentioned details and thus specific description thereof will not be repeated herein.

When the information on the SPS POC LSB is transmitted through the SPS as in the example shown in Table 14, the LTRP-relevant information defined in the slice header may be expressed, for example, as in Table 15.

TABLE 15

| | Descriptor |
|---|---|
| slice_header( ) { | |
| ... | |
| if( long_term_ref_pics_present_flag ) { | |
| num_long_term_pics | ue(v) |
| if( num_long_term_ref_pics_sps > 0 ) | |
| num_long_term_sps | ue(v) |
| for( i = 0; i < num_long_term_sps + num_long_term_pics; i++ ) { | |
| if ( i < num_long_term_sps ) | |
| lt_idx_sps[ i ] | u(v) |
| else { | |
| poc_lsb_lt[ i ] | u(v) |
| used_by_curr_pic_lt_flag[ i ] | u(1) |
| } | |
| delta_poc_msb_present_flag[ i ] | u(1) |
| if( delta_poc_msb_present_flag[ i ] ) | |
| delta_poc_msb_cycle_lt[ i ] | ue(v) |
| } | |
| } | |
| ... | |
| } | |

In the examples shown in Tables 11 to 13, used_by_curr_pic_lt_flag[i] may be applied to both the first candidate LTRPs and the second candidate LTRPs. That is, it may be determined by used_by_curr_pic_lt_flag[i] transmitted through the slice header whether the first candidate LTRPs and the second candidate LTRPs are used as reference pictures of the current picture. As described above, the first candidate LTRPs may be determined on the basis of lt_idx_sps[i] and the second candidate LTRPs may be determined on the basis of poc_lsb_lt[i].

When used_by_curr_pic_lt_sps_flag[i] is transmitted through the SPS as in the example shown in Table 14, it may be determined on the basis of used_by_curr_pic_lt_sps_flag[i] whether the first candidate LTRPs are used as reference pictures of the current picture. For example, as the example shown in Table 12, the POC LSB of the i-th candidate LTRP to be included in the long-term reference picture set of the current picture (and/or the current slice) may be lt_ref_pic_poc_lsb_sps[lt_idx_sps[i]]. At this time, it may be determined on the basis of the value set as used_by_curr_pic_lt_sps_flag[lt_idx_sps[i]] whether the i-th candidate LTRP is used as a reference picture of the current picture.

Therefore, used_by_curr_pic_lt_flag[i] transmitted through the slice header in Table 15 may be used to determine whether the second candidate LTRPs are used as reference pictures of the current picture. Accordingly, used_by_curr_pic_lt_flag[i] may not be transmitted when lt_idx_sps[i] is transmitted, and may be transmitted only when poc_lsb_lt[i] is transmitted. Referring to Table 15, used_by_curr_pic_lt_sps_flag[i] may be transmitted along with poc_lsb_lt[i] instead of lt_idx_sps[i]. That is, used_by_curr_pic_lt_sps_flag[i] in the example shown in Table 15 may specify whether the second candidate LTRP determined on the basis of poc_lsb_lt[i] is used as a reference picture of the current picture.

Details of the LTRP-relevant information defined in the SPS in the example shown in Table 14 are the same as defined in the SPS of Table 11 except for the above-mentioned details and thus specific description thereof will not be repeated herein.

Table 16 shows another example of the LTRP-relevant information defined in the slice header when the LTRP-relevant information is transmitted as in the example shown in Table 14.

TABLE 16

|  | Descriptor |
|---|---|
| slice_header( ) { | |
| ... | |
| if( long_term_ref_pics_present_flag ) { | |
|   num_long_term_pics | ue(v) |
|   if( num_long_term_ref_pics_sps > 0 ) | |
|     num_long_term_sps | ue(v) |
|   for( i = 0; i < num_long_term_sps + num_long_term_pics; i++ ) { | |
|     if ( i < num_long_term_sps ) | |
|       lt_idx_sps[ i ] | ue(v) |
|     else { | |
|       poc_lsb_lt[ i ] | u(v) |
|       used_by_curr_pic_lt_flag[ i ] | u(1) |
|     } | |
|     delta_poc_msb_present_flag[ i ] | u(1) |
|     if( delta_poc_msb_present_flag[ i ] ) | |
|       delta_poc_msb_cycle_lt[ i ] | ue(v) |
|     } | |
|   } | |
| ... | |
| } | |

In the example shown in Table 15, u(v) is set as a descriptor of lt_idx_sps[i]. Accordingly, a "fixed length encoding" method based on a fixed number of bits v may be applied to lt_idx_sps[i]. However, since an LTRP has a feature that it is not changed in a very long period, it may be inefficient to apply the fixed length encoding to lt_idx_sps[i].

Therefore, an encoding method of adaptively determining a bit length may be applied to lt_idx_sps[i]. An example of the encoding method of adaptively determining a bit length may be an exponential golomb encoding method.

Referring to Table 16, ue(v) may be set as a descriptor of lt_idx_sps[i]. That is, lt_idx_sps[i] may be encoded and transmitted using ue(v) through the use of slice header. ue(v) may specify a syntax element to be encoded on the basis of the exponential golomb encoding method. Accordingly, in the example shown in Table 16, lt_idx_sps[i] may be encoded on the basis of an exponential golomb code and may be transmitted to the video decoder. Here, the exponential golomb code may be, for example, a 0-th order exponential golomb code.

When the fixed length encoding method is applied as in the example shown in Table 16, the number of bits used to express lt_idx_sps[i] may be "ceil(log 2(num_long_term_ref_pics_sps))". However, when the exponential golomb encoding method is used, the bit length may be variably determined on the basis of the exponential golomb code and thus the number of bits used to express lt_idx_sps[i] may be variable. Therefore, in the example shown in Table 16, the number of bits used to express lt_idx_sps[i] may not be "ceil(log 2(num_long_term_ref_pics_sps))".

Details of the LTRP-relevant information defined in the slice header in the example shown in Table 16 are the same as in the example shown in Table 15 except for the above-mentioned details and thus specific description thereof will not be repeated.

Figure 6:
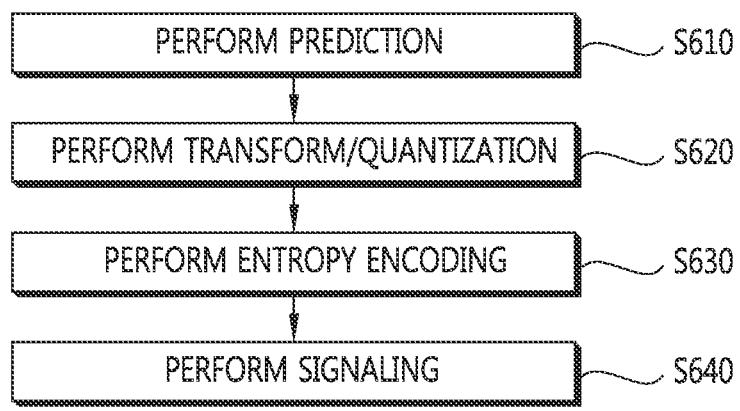
FIG. 6 is a flowchart schematically illustrating an encoding procedure which is performed by a video encoder according to the present invention.

FIG. 6 is a flowchart schematically illustrating an encoding procedure which is performed by a video encoder according to the present invention. The video encoder performing the encoding procedure illustrated in FIG. 6 may correspond to the video encoder described above with reference to FIG. 1.

Referring to FIG. 6, the video encoder may perform a prediction operation on a current block (S610). The video encoder may perform inter prediction or intra prediction on the current block. When the inter prediction is performed, reference pictures to be used to motion compensation of the current block may be determined on the basis of a reference picture list. Here, the reference picture list may be constructed or initialized on the basis of the reference picture set as described above. The examples of the procedure of constructing a reference picture set and the procedure of constructing a reference picture list on the basis of the reference picture set are described above and thus description thereof will not be repeated herein.

The video encoder may transform/quantize the prediction result on the current block (S620). At this time, the video encoder may transform/quantize a residual block corresponding to a difference between the prediction result and the original block.

The video encoder may entropy-encode the transformed/quantized information (S630). At this time, the video encoder may entropy-encode information for constructing the reference picture set together. CABAC may be used as the entropy encoding method.

The video encoder may signal the entropy-encoded information (S640). At this time, the signaled information may include information for constructing the reference picture set for the current picture (and/or the current block). The reference picture set may be constructed for each slice (and/or picture) and information for constructing the reference picture set may be transmitted in a state where it is included in the SPS, the PPS, and/or the slice header as described above. The specific examples of the information for constructing the reference picture set are described above and specific description thereof will not be repeated herein.

While the operations of the video encoder are schematically described with reference to FIG. 6 so as to easily understand the present invention in consideration of the details of the reference picture set and the reference picture list, this is for convenience of explanation and the operations of the video encoder according to the present invention may include the operations described with reference to FIG. 1.

Figure 7:
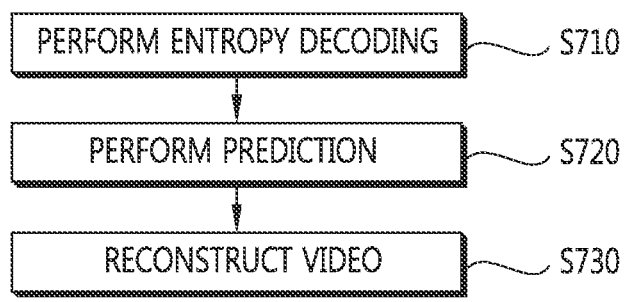
FIG. 7 is a flowchart schematically illustrating a decoding procedure which is performed by a video decoder according to the present invention.

FIG. 7 is a flowchart schematically illustrating a decoding procedure which is performed by a video decoder according to the present invention. The video decoder performing the decoding procedure illustrated in FIG. 7 may correspond to the video decoder described above with reference to FIG. 2.

Referring to FIG. 7, the video decoder may receive a bit stream from the video encoder and may perform an entropy decoding operation (S710). The bit stream received from the video encoder may include information for constructing a reference picture set. As described above, the information for constructing the reference picture set may be received in a state where it is included in the SPS, the PPS, and/or the slice header. The specific examples of the information for constructing the reference picture set are described above and thus specific description thereof will not be repeated herein.

The video decoder may perform a prediction operation on the current block on the basis of the entropy-decoded information (S720). The prediction method for the current block may be transmitted from the video encoder. When the prediction method for the current block is inter prediction, the video decoder may perform the prediction operation using the reference picture list constructed on the basis of the received information.

Here, the reference picture list may be constructed or initialized on the basis of the reference picture set as described above. The examples of the procedure of constructing a reference picture set and the procedure of constructing a reference picture list on the basis of the reference picture set are described above and thus description thereof will not be repeated herein. The constructed reference picture list may be stored in a memory of the video decoder.

The video decoder may reconstruct a video (S730). The video decoder may reconstruct the current block on the basis of the prediction on the current block and may reconstruct a video using the reconstructed blocks. When a skip mode is used, the residual signal is not transmitted and thus the predicted block may be used as a reconstructed block. When a merge mode or an MVP mode is used, the video decoder may reconstruct the current block by adding the predicted block and the residual block.

In this description, terms such as a "picture included in a reference picture set", an "x-th picture in a reference picture set", a "picture included in a reference picture list", and an "x-th picture in a reference picture list" are used, but these terms are intended only for convenience of explanation. A picture in the reference picture set or a reference picture list may be a picture of which corresponding POC information is included in the reference picture set or the reference picture list. The x-th picture in the reference picture set or the x-th picture in the reference picture list may be a picture in which the corresponding POC information is arranged in the reference picture set or the reference picture list.

While the methods in the above-mentioned embodiments have been described on the basis of the flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. An image decoding method performed by a decoding apparatus, the method comprising:
    acquiring image information including long term reference picture (LTRP) information from a bitstream;
    configuring a reference picture set based on the LTRP information;
    generating predicted samples for a current block in a current picture based on an LTRP in the reference picture set; and
    generating reconstructed samples based on the predicted samples,
    wherein the LTRP information comprises first LTRP information included in a sequence parameter set (SPS) of the bitstream,
    wherein the LTRP is one of candidate LTRPs specified by the first LTRP information,
    wherein the reference picture set comprises an LTRP set including at least one LTRP,
    wherein the first LTRP information includes a long term reference pictures present flag,
    wherein based on a value of the long term reference pictures present flag being equal to 1, the first LTRP information includes an LTRP number syntax element representing a number of the candidate LTRPs specified in the SPS and picture order count (POC) least significant bit (LSB) information representing an LSB of a POC of each of the candidate LTRPs, and
    wherein the first LTRP information includes used by current picture long term SPS flag information representing whether each of the candidate LTRPs specified in the SPS is not used for reference picture by the current picture.

2. An image encoding method performed by an encoding apparatus, the method comprising:
    generating predicted samples for a current block in a current picture based on a long term reference picture (LTRP) in a reference picture set;
    generating LTRP information used for configuring the reference picture set; and
    encoding image information including the LTRP information,
    wherein the LTRP information comprises first LTRP information included in a sequence parameter set (SPS) of the image information,
    wherein the LTRP is one of candidate LTRPs specified by the first LTRP information,
    wherein the reference picture set comprises an LTRP set including at least one LTRP,
    wherein the first LTRP information includes a long term reference pictures present flag,
    wherein based on a value of the long term reference pictures present flag being equal to 1, the first LTRP information includes an LTRP number syntax element representing a number of the candidate LTRPs specified in the SPS and picture order count (POC) least significant bit (LSB) information representing an LSB of a POC of each of the candidate LTRPs, and
    wherein the first LTRP information includes used by current picture long term SPS flag information representing whether each of the candidate LTRPs specified in the SPS is not used for reference picture by the current picture.

3. A non-transitory computer readable digital storage medium storing image information generated by a method, wherein the method comprising:
- generating predicted samples for a current block in a current picture based on a long term reference picture (LTRP) in a reference picture set;
- generating LTRP information used for configuring the reference picture set; and
- encoding the image information including the LTRP information,
- wherein the LTRP information comprises first LTRP information included in a sequence parameter set (SPS) of the image information,
- wherein the LTRP is one of candidate LTRPs specified by the first LTRP information,
- wherein the reference picture set comprises an LTRP set including at least one LTRP,
- wherein the first LTRP information includes a long term reference pictures present flag,
- wherein based on a value of the long term reference pictures present flag being equal to 1, the first LTRP information includes an LTRP number syntax element representing a number of the candidate LTRPs specified in the SPS and picture order count (POC) least significant bit (LSB) information representing an LSB of a POC of each of the candidate LTRPs, and
- wherein the first LTRP information includes used by current picture long term SPS flag information representing whether each of the candidate LTRPs specified in the SPS is not used for reference picture by the current picture.

* * * * *